(12) United States Patent
Parks et al.

(10) Patent No.: US 7,624,656 B2
(45) Date of Patent: Dec. 1, 2009

(54) CONTINUOUSLY VARIABLE TRANSMISSION

(75) Inventors: Albert Harold Parks, Minden, NV (US); Ning Zheng, Carson City, NV (US)

(73) Assignee: BHSCI LLC, Norfork, NE (US)

( * ) Notice: Subject to any disclaimer, the term of this patent is extended or adjusted under 35 U.S.C. 154(b) by 835 days.

(21) Appl. No.: 11/096,197

(22) Filed: Mar. 31, 2005

(65) Prior Publication Data

US 2005/0229731 A1 Oct. 20, 2005

Related U.S. Application Data

(60) Provisional application No. 60/558,643, filed on Apr. 1, 2004.

(51) Int. Cl.
*F16H 21/00* (2006.01)
(52) U.S. Cl. ............................................. 74/63; 74/112
(58) Field of Classification Search .................. 74/112, 74/116, 63, 122
See application file for complete search history.

(56) References Cited

U.S. PATENT DOCUMENTS

| | | | | |
|---|---|---|---|---|
| 2,159,739 A * | 5/1939 | Johnson | ........................ | 475/16 |
| 2,864,259 A | 12/1958 | Troeger | ........................ | 74/113 |
| 2,878,688 A | 3/1959 | Palmer | ........................ | 74/568 |
| 3,213,697 A | 10/1965 | Hartmann et al. | ............. | 74/117 |
| 3,750,485 A | 8/1973 | Blakemore | .................. | 74/125.5 |
| 3,848,474 A | 11/1974 | Epstein | ......................... | 74/117 |
| 4,373,926 A | 2/1983 | Fullerton | ....................... | 474/57 |
| 4,487,085 A | 12/1984 | Collins | ........................ | 74/113 |
| 4,646,579 A | 3/1987 | Klein | ........................ | 74/18.1 |
| 4,693,134 A | 9/1987 | Kraus | ........................ | 74/690 |
| 4,793,208 A | 12/1988 | Bregnard et al. | ........... | 74/594.2 |
| 4,823,627 A | 4/1989 | Mills | ........................... | 74/117 |
| 4,873,893 A | 10/1989 | Blakemore | ................ | 74/752 B |
| 5,071,393 A | 12/1991 | Genovese | .................... | 475/166 |
| 5,081,877 A | 1/1992 | Mercat | ......................... | 74/116 |
| 5,215,323 A | 6/1993 | Cowan | ........................ | 280/236 |
| 5,454,766 A | 10/1995 | Mills | ........................... | 475/170 |
| 6,068,570 A | 5/2000 | Han | ............................ | 475/207 |
| 6,085,613 A | 7/2000 | Niculescu | ................... | 74/594.2 |
| 6,348,021 B1 | 2/2002 | Lemanski | ................... | 475/164 |
| 6,354,976 B1 | 3/2002 | Mills | ........................... | 475/170 |
| 6,425,301 B1 | 7/2002 | Rubenstein | ................. | 74/124 |
| 6,447,421 B1 | 9/2002 | Wren | ........................ | 475/170 |
| 2004/0003672 A1 | 1/2004 | Rubenstein | ................. | 74/125 |

FOREIGN PATENT DOCUMENTS

| | | |
|---|---|---|
| EP | 0 380 828 A1 | 8/1990 |
| WO | WO 95/19909 | 7/1995 |

* cited by examiner

*Primary Examiner*—William C Joyce
(74) *Attorney, Agent, or Firm*—Seed IP Law Group PLLC

(57) ABSTRACT

A torque transfer mechanism for use as a continuously variable transmission that includes an input shaft, a cam member, a torque-splitting mechanism cooperating with the cam member, and a torque output assembly for coupling the torque splitting mechanism to an output shaft when there is substantially zero relative velocity between the moving parts to be disconnected to minimize torque feedback to the input shaft.

18 Claims, 22 Drawing Sheets

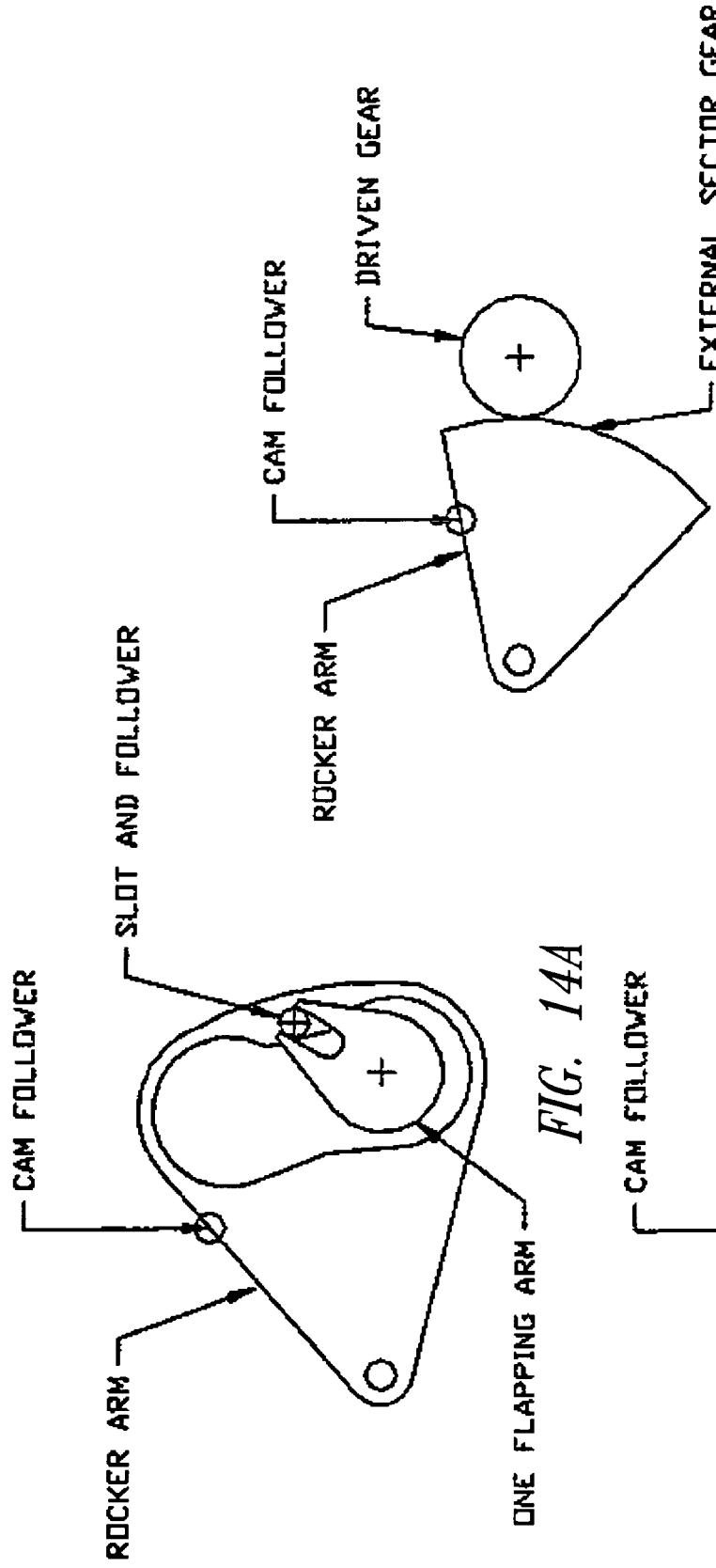
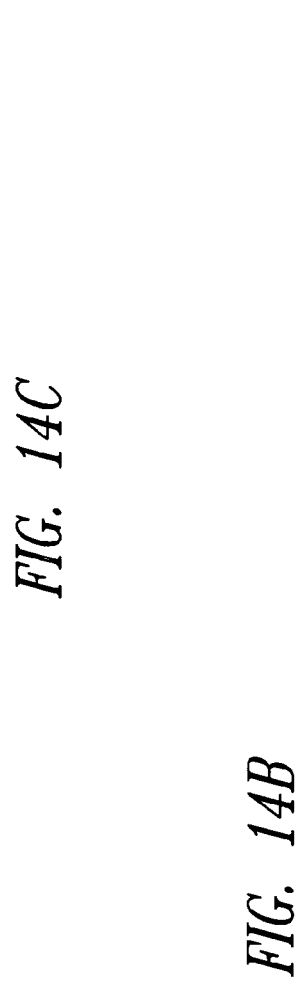
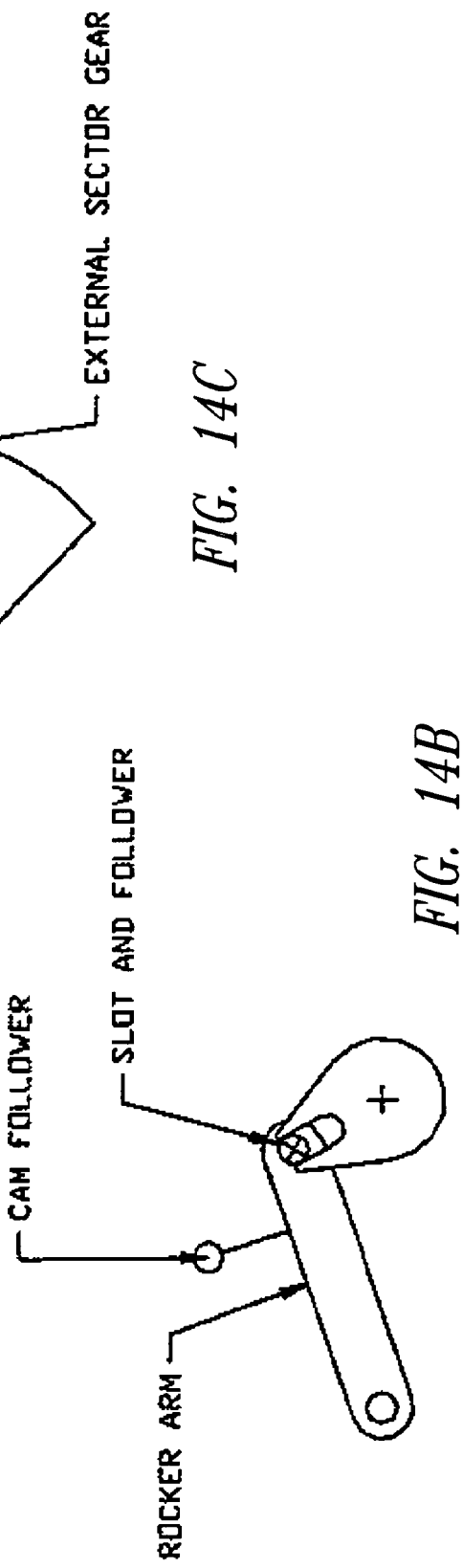
FIG. 14A
FIG. 14B
FIG. 14C

RADIAL DISTANCE TO CURVE EQUATES TO RELATIVE TORQUE FEEDBACK AT THE PEDAL AT EACH DEGREE OF ROTATION

CONTINUOUSLY VARIABLE TRANSMISSION

BACKGROUND OF THE INVENTION

1. Technical Field

The present invention pertains to a transmission system, and more particularly to a mechanical continuously variable transmission particularly suited for human-powered vehicles.

2. Description of the Related Art

Continuously variable speed transmissions are used for power and rotational motion transmission in a variety of applications where continuous variation of input to output ratio is beneficial. Variable speed transmissions attempt to provide for a seamless transition throughout the available speed range. This can be particularly challenging when the input to the transmission, such as torque and speed input, has a cyclic variation, such as that generated by a rider pedaling a bicycle crank.

The torque and speed input to the pedals of a bicycle vary at twice the frequency of the pedaling rotation with an approximately sinusoidal waveform. The relationship between average pedal RPM and bicycle speed on a standard bicycle is not constant because the torque input to the pedal shaft is approximated by a sine function of the rotation of the pedal shaft. FIG. 1 is a graph illustrating the effective force in pounds as a function of the pedal crank angle in degrees. This graph shows the effect of force (sum of both legs) at the bicycle wheel plotted against crank angle in degrees. (See, P. R. Cavanagh and D. J. Sanderson, "The Biomechanics of Cycling: Studies of the Pedaling Mechanics of Elite Pursuit Riders" as published in the *Science of Cycling,* pages 91-102.)

Although a bicycle rider may feel that the force applied by their legs to the pedals is steady, the graph of FIG. 1 shows that the force is neither constant nor steady. Thus, a variable-speed transmission for a bicycle would have to accommodate the cyclic speed variations and their consequent reflected torque impulses in a manner that provides a smooth transmission in the effective ratio between the input and the output and that provides an even feel to the rider.

A large body of art has been developed in this field, which will be described in more detail below. These approaches include variable speed belt drives, typical fixed-ratio, discreet-ratio, or continuous-ratio (epicyclic) gear drives, tractions drives, impulse drives, periodic drives, and the like. The traction drive in various forms is a popular variant due to some distinct benefits relative to other concepts, such as impulse drives.

Impulse drives rely upon adjustable lever arm ratios to generate a variable gear ratio. Such lever arm ratios are most often achieved by eccentric offset of a driving and driven member, with load transmitting elements in between. These load transmitting elements are numerous, and alternately carry the load for a short period when the lever arm ratio is as desired, and relax during the rest of a cycle via the use of one way clutches, ratchets, or pawls. For this reason, these drives are also referred to as periodic drives. The alternate load carrying of the load transmitting elements and the underlying kinematic motion result in speed variation during a cycle of an impulse drive.

Traction drives provide smooth operation by the use of a rolling radius ratio between a driving and driven member. The simplest concept of a traction drive is two wheels rolling together, which is a fixed gear ratio. Their operation is smooth, i.e., there are no speed variations through the unit for a fixed gear ratio setting, and there is no need for the use of one way clutches, ratchets, or pawls.

Continuous gear ratio variation in a traction drive is obtained by using driving and driven members of unique shapes in which a rolling radius can be changed on the fly. Traction drives are often characterized by the transference of torque from a rotating input member through a rotating intermediary member to a rotating output member. The intermediary member contacts the input and output members at various radii that effect a change of ratios between the input and the output members. The torque is transmitted through the system by traction or friction between the input, output, and intermediary members. A fluid can be used within the traction drive that becomes solid at some applied compression force to enhance the traction.

The use of intermediate members also provides the opportunity to further change gear ratio and increase the gear range. Some means is provided for varying the rolling radius ratio by mechanical adjustment of one or more parts. Shifting of a traction drive is relatively easy because the shifting path is generally perpendicular to the primary load transmission path. The patents of Blake (U.S. Pat. No. 5,597,056), Lutz (U.S. Pat. No. 5,318,486), and Schievelbusch (U.S. Pat. No. 5,273,501) are exemplars of such systems for bicycle applications using cone-, toroid-, and ball-type traction devices respectively.

The device disclosed in the patent of Kitchen and Storey (U.S. Pat. No. 1,083,328) is another example of an industrial traction drive that is particularly compact due to the use of a hemispherical geometry. This patent also shows a variety of arrangements of intermediate members to achieve different effects, such as reverse gears.

Such traction drives are well proven and in extensive industrial use. They are generally assumed to be most useful at high speeds and low torques so as not to overload the traction mechanism, which can result in slipping. Efficiency, however, decreases with increased torque due to micro-slip. Also, traction drives are not used in situations where a shifting between gear ratios occurs often.

The primary disadvantage of continuously variable traction drives is that they must rely upon friction for their operation. Gear teeth cannot be used because of the continuously variable geometry during shifting of the gear ratio.

Traction drives in industrial use commonly use metallic parts, and friction is developed through high normal pressure between the parts, often in conjunction with special traction fluids which enhance the friction. The high normal pressure required to develop useful traction results in heavy parts to take the loads. In some cases, input gearing is used to increase internal speeds and reduce required traction, but at the expense of efficiency losses in the additional gear meshes. The use of metals, which are very stiff, also requires the parts to be made with very high precision, like a rolling element bearing, leading to high cost of manufacture. Finally, the very stiff material used and the variable geometry of rolling introduces relative sliding between parts and resulting wear. Indeed, the inventions of the exemplar patents mentioned above are not currently on the market, probably for these reasons.

Another CVT drive type that operates by traction is a rubber belt drive with variable radius sheaves, such as a typical snowmobile transmission. These drives are not compact or lightweight to the extent that the present invention enables, as will be described below. Also, those systems do have force feedback to the shifter, which in the case of a snowmobile is automatic, but they can be a nuisance in other applications.

Attempts have been made to apply traction drives to bicycles. However, conventional traction drives suffer from weight problems due to the need to react high normal loads that are necessary to generate traction. One proposed traction drive, known as the toroidal traction drive, utilizes a driving member and driven member that are toroidal shaped, and an intermediate wheel that transmits the load. Some designs require a third member to react the normal forces. Examples of these types of drives can be found in U.S. Pat. Nos. 4,735,430, 4,858,484, 4,964,312, 4,086,820, 5,020,384, and 4,934,206. While these drives offer advantages such as low "stutter" (such as vibrations caused from torque feedback due to the cyclic variations at a different frequency from the input rotation), high efficiency, a compact space, large gear ranges, and may be automated for torque response, they also have the drawbacks of high contact loads requiring heavy parts, inability to shift at zero speed, and low shifter force and feedback in shifting the toroidal traction drive.

In a ball traction drive, such as that disclosed in U.S. Pat. No. 5,318,486 for a driving hub for a vehicle, the driving and driven members are shaped like typical bearing races, and a ball (35) transmits the load. Such designs require a third member to react the normal forces, as also disclosed in U.S. Pat. No. 5,236,403. While these designs offer little stutter, are compact and efficient, and may be automated and have large gear ranges, they generally have high contact loads that require heavy parts, cannot shift at zero speed, and have low shifter force and feedback.

Another design involves a wheel on a disc traction drive, such as disclosed in U.S. Pat. Nos. 4,819,494 and 5,626,354, where a wheel comprises the driving member, and the driven member is formed from a plate or disc. These designs suffer from not having a robust third member to react the normal forces. Some designs use a pair of pre-loaded discs to increase reaction capability, which helps in eliminating stutter and facilitates automated or torque response. However, these designs have high contact stresses compared to other designs and cannot shift at zero speed.

Other designs include the ring-and-cone traction drive and the ball-on-disc traction drive. The former is widely used for industrial purposes and uses an inclined cone against a cylindrical ring with traction load transmission, the ring moving axially along the cone to change the gear ratio, resulting in low stutter and high efficiency. However, this design is too large for a bicycle and has complex shifting mechanisms, limited ratios of gearing, and an inability to shift at zero speed. The latter utilizes discs to transmit a load by multiple balls, which provides load sharing and lower contact stresses, thus achieving simplicity, low part count, and a more simple shifter, but requiring offset shafts that are large, having an inability to shift at zero speeds, and a low efficiency due to ball carrier friction.

Yet another design is that found in U.S. Pat. No. 1,083,328, referenced above, for a variable-speed friction gearing wherein first and second hemispherical halves comprise driving and driven members that are interconnected by at least one pair of idler wheels that vary their contact position along the inside of the spheres. While this design shows promise for applications to bicycles, it also suffers from high contact loads, and an inability to shift at zero speed. Its advantages, however, include low stutter, compactness, low parts count that are inexpensive to manufacture, high efficiency, and a gear range of 6 to 1 in small size drives with low shifter force and torque.

Another type of transmission is where there is a periodic connection between the input and output rotating members to transfer the torque from the input to the output. This type is characterized by a cyclic variation in the output rotation speed with a constant input rotation speed. The cyclic variations in the output rotation speed reflect a torque variation to the input when there is a substantially constant torque load. Many methods have been proposed to mitigate the variation, typically involving complex mechanisms that do not eliminate the variation completely.

In U.S. Pat. No. 4,873,893, an infinitely variable positive mechanical transmission is disclosed that, in a first embodiment, transmits power from an input shaft to an output shaft utilizing a gear on the output shaft meshed with an idler gear that is coupled to the input shaft through a wobble plate mounted on the input shaft and a connecting rod coupled between the wobble plate and the idler gear. This particular approach requires the use of multiple gears, in this case a plurality of idler gears that are meshed with the gear on the output shaft and each of the idler gears is coupled to the wobble plate through a connecting rod and a one-way gear or brake.

Another variation utilizes an eccentric member to move an element away from a main rotary input axis of the device and a clutch to periodically connect the rotary input motion to the rotary output motion. An example of this approach would be the use of a ratchet and pawl as a speed variator, done by handing off the connection from one pawl to the next as the relative speed of one pawl to the ratchet overtakes that of another pawl. An eccentric element is used to cause the hand-off to occur at a point of maximum relative velocity between the ratchet and the pawl. The disadvantage of this attempt is that the instantaneous matching of speed at the maximum relative velocity between the parts creates a very large force in addition to the useful torque being transferred between the ratchet and the pawl. This can result in unevenness in the output, and it increases wear on the parts, requiring heavier and more costly drive train components.

BRIEF SUMMARY OF THE INVENTION

The disclosed embodiments of the present invention overcome the problems of conventional transmissions but retain the advantages of smooth operation, easy shifting, and an extended usable gear range. In accordance with one embodiment of the invention, a mechanical rotary continuously variable transmission is provided. The transmission includes a non-rotating housing; a central axle rotatably mounted in the housing and configured to receive an input torque; a torque-split mechanism coupled to the central axle; a control mechanism coupled to the housing for controlling the torque-split mechanism; and a clutch mechanism coupled to the torque-split mechanism and selectively coupled to an output. Ideally, the torque split mechanism is rotated with the central axle and the output is a sum of the input rotation combined with any variations caused by the torque split mechanism. The zero clutches shift between multiple sections of the torque split mechanism at near to a relative velocity to minimize torque feedback to the input.

In accordance with another embodiment of the invention, a mechanical cam-and-clutch continuously variable transmission is provided that includes a housing; a torque input shaft rotatably mounted in the housing; a cam mounted to the housing and configured to move relative to the input shaft; a device for moving the cam relative to the longitudinal axis of the input shaft; first and second shuttle arms coaxial with the input shaft, each of the first and second shuttle arms having a lever on a first end of a shaft of the shuttle arm and oppositely disposed from the lever of the other shuttle arm, and each shuttle arm having a clutch input device at a second end of the shuttle arm thereof; first and second followers coupled to the lever on the respective first and second shuttle arm and coupled to the cam; and a clutch output device configured to alternately connect the clutch input devices on the second end of the first and second shuttle arm to an output shaft. Ideally, the alternate connection of the clutch input device on the second end of the first and second shuttle arm to the output shaft is done at a zero relative velocity between the moving parts to be coupled together.

Preferably, the levers are moved rotationally by a shuttle that rotates with the shaft and that is moved laterally by followers on the eccentrically movable cam. This motion of the shuttle moves the levers and therefore the concentric shuttle arm shafts alternately in a prograde and retrograde period with respect to the main shaft. The clutches alternately connect the concentric shuttle arm shafts that are driven by the levers, shuttle, and cam to the output during either the prograde or retrograde period, depending on whether rotary motion is to be added or subtracted to the input shaft rotation thereby effecting an average speed increase or decrease.

In accordance with another embodiment of the invention, a rotary force transfer device is provided that includes a housing, a central axle rotatably mounted in the housing and configured to receive an input torque, a torque-split mechanism comprising a cam coupled to the housing and a reciprocating mechanism driven by eccentricity of the cam mounted on the housing to split torque from the central axle, a control mechanism coupled to the housing for controlling the torque-split mechanism; and a clutch mechanism selectively coupling the reciprocating means to an output. Ideally, the clutch mechanism couples the central axle to the output in a 1:1 ratio when there is zero relative velocity between moving parts in the reciprocating mechanism.

In accordance with another embodiment of the invention, a mechanical cam-and-clutch continuously variable transmission is provided that includes a housing, a torque input shaft rotatably mounted in the housing, a cam mounted to the housing and configured to move in a direction transverse to a longitudinal axis of the input shaft, a device for moving the cam relative to the longitudinal axis of the input shaft, a torque transfer mechanism comprising a shuttle carrier mounted on the input shaft to rotate with the input shaft, a shuttle assembly mounted over the shaft and cooperating with the shuttle carrier and the cam, the shuttle assembly including a shuttle follower mounted over the input shaft to rotate independent of the input shaft, and first and second torque transfer shafts rotatably mounted over the input shaft and coaxial with each other and with the input shaft, each of the first and second torque transfer shafts having a coupling device on a first end of the shaft for coupling the torque transfer shaft to the shuttle follower, and each shaft having a clutch input device at a second end thereof; and a clutch output device configured to alternately connect the clutch input devices on the second end of the first and second shafts to an output shaft.

In accordance with another embodiment of the invention, a vehicle is provided, the vehicle having a rotary force transfer device that includes a housing, a central axle rotatably mounted in the housing and configured to receive an input torque, a cam mounted on the housing, a torque-split mechanism comprising a reciprocating mechanism driven by the eccentricity of the cam to split torque input to the central axle, a control mechanism coupled to the housing for controlling the cam, and a clutch mechanism selectively coupling the reciprocating mechanism to an output. Ideally, the reciprocating mechanism can be in the form of a pair of rocker arms cooperating with a shuttle follower or a shuttle assembly having a shuttle follower and a pair of torque transfer shafts coupled thereto.

It is to be understood that the vehicle can be a bicycle, wheelchair, a motorized vehicle, or an aircraft, and the invention can be adapted for use with a machine that is powered by a prime mover, including human power, combustion engine, electric motor, or any device that can provide a torque input, although other forms of input can be used and converted to torque input.

In accordance with still yet another embodiment of the invention, a torque transfer mechanism is provided that includes an input shaft for receiving an input torque, a fixed cam member, a torque split assembly operatively coupled to the cam member and configured to split the input torque into a first output torque and a second output torque, and a torque output assembly coupled to the torque split assembly and configured to couple the first input torque to an output shaft and to couple the second output torque to the output shaft when there is zero relative velocity between moving parts of the torque split assembly to be coupled to the output shaft.

As will be readily appreciated from the foregoing, in the disclosed embodiments of the present invention, the housing is stationary while the central axle rotates, and the eccentric cam mounted on the housing does not rotate relative to the housing. Because the cam does not rotate, the eccentric elements do not need to be circular. The clutch is periodically connected between the input and output at a period in the cycle with substantially zero relative velocity between the parts to be connected. Therefore, the forces between the elements are essentially restricted to the torque being transmitted through the device at that time.

Because these devices inherently have a cyclic variation in rotation from input to output, the ability to make the eccentric element non-circular, or cam shaped, permits modification of the rate and the position of the speeding up (accelerating) or slowing down (decelerating) portion of the cycle to effect a continuously variable average speed ratio between the input and the output. Keeping speed variations in phase with the pedal effort minimizes the apparent affects to the rider of a bicycle. More particularly, because the arrangement of elements accomplishes speed variation by diverting only a portion of the torque through a speed variator, the subjective feel of the rider to the transmission can be manipulated. Although mechanically continuously variable transmissions with output speed variation using eccentric members have been proposed for many years, as discussed above, none of these previous systems maintained the phase of the cyclic variations inherent in a periodic drive throughout the available ratio range. As a result, vibrations are experienced by the rider because the frequency of the cyclic variations are different from the pedaling frequency rather than being in phase with it. The disclosed embodiments of the present invention achieve close to a zero phase difference because of the torque-splitting configuration.

Thus, the present invention achieves high efficiency, size reduction, reduction in part number and weight of parts, a low manufacturing cost, easy assembly, and a long lifetime due to its durability. Transmission of proper torque without torque split at a 1:1 ratio and applying the torque split with a cam shifting mechanism by electronically or manually varying the position of the eccentric member and periodic connection via the clutch shift mechanism at relative zero velocity between the connecting parts achieves a natural feeling to the rider. The rider will feel little difference between the present invention and conventional sprocket and chain mechanisms because the transmission of the present invention is not a constant torque-split device.

BRIEF DESCRIPTION OF THE DRAWINGS

The foregoing and other features and advantages of the present invention will be more readily appreciated as the same become better understood from the following detailed description when taken in conjunction with the accompanying drawings, wherein:

FIGS. 14A-14C are yet further schematic representations of possible geometric relationships of the rocker arm, main shaft, and cam follower;

DETAILED DESCRIPTION OF THE INVENTION

Figure 1:
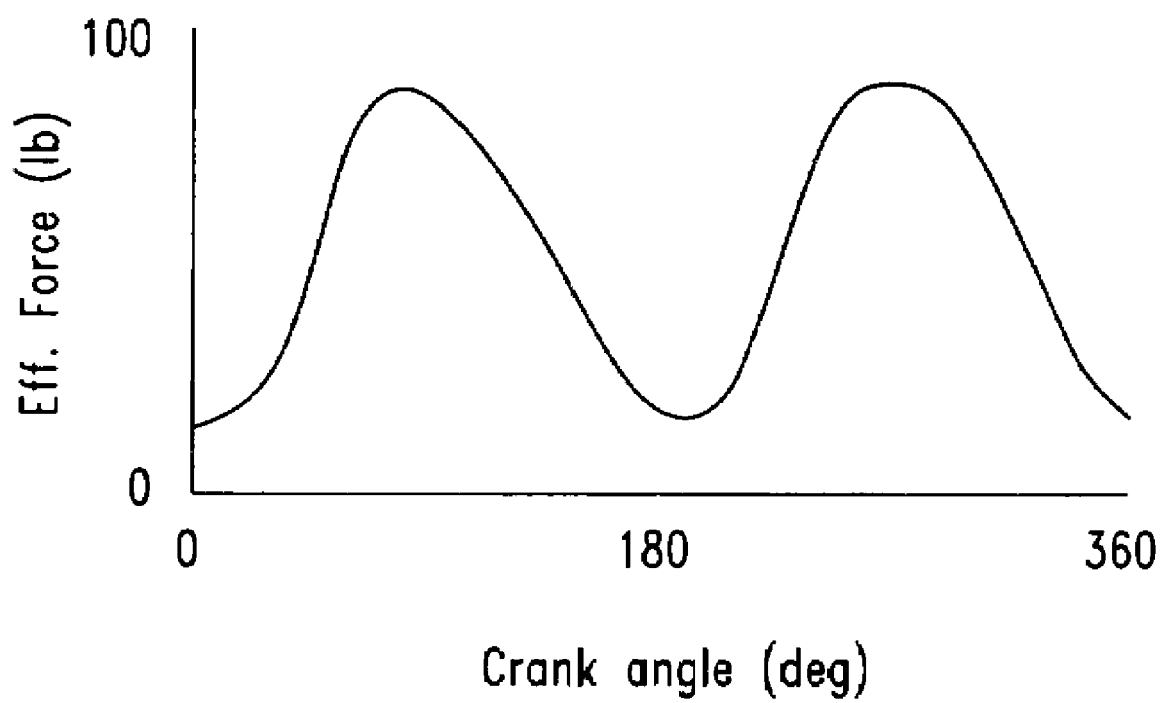
FIG. 1 is a graph of the effective force in pounds at maximum effort as a function of crank angle degree in a conventional bicycle transmission with a standing rider.

The disclosed embodiments of the present invention are suited for human-powered vehicles, such as bicycles, having a rotary input. It is to be understood that while the embodiments of the invention are described in the context of human-powered bicycles, they will have application to other devices receiving rotary input in the form of the approximately sinusoidal input force depicted in FIG. 1.

All of the embodiments of the present invention function as a full-wave rectifier, the clutch acting as the rectifying elements and smoothing out the pseudo-sinusoidal torque input at each complete cycle of applied torque that is generated by one stroke of a human prime mover. In one embodiment, concentric shafts counter-rotate with respect to each other by the action of a shuttle or rocker arms reacting to the motion imposed on them by a cam interacting with cam followers. The clutches on the output ends of the concentric shafts only transmit motion in one direction (forward) therefore acting as the rectifiers. As previously discussed, prior proposed devices having internal period cyclic variations with the average speed ratio tend to generate unacceptable vibrations that are caused by torque feedback at a different frequency than the torque input. The transmission disclosed herein utilizes a parallel internal mechanism that maintains a zero phase difference because of its torque-splitting nature.

Figure 2:
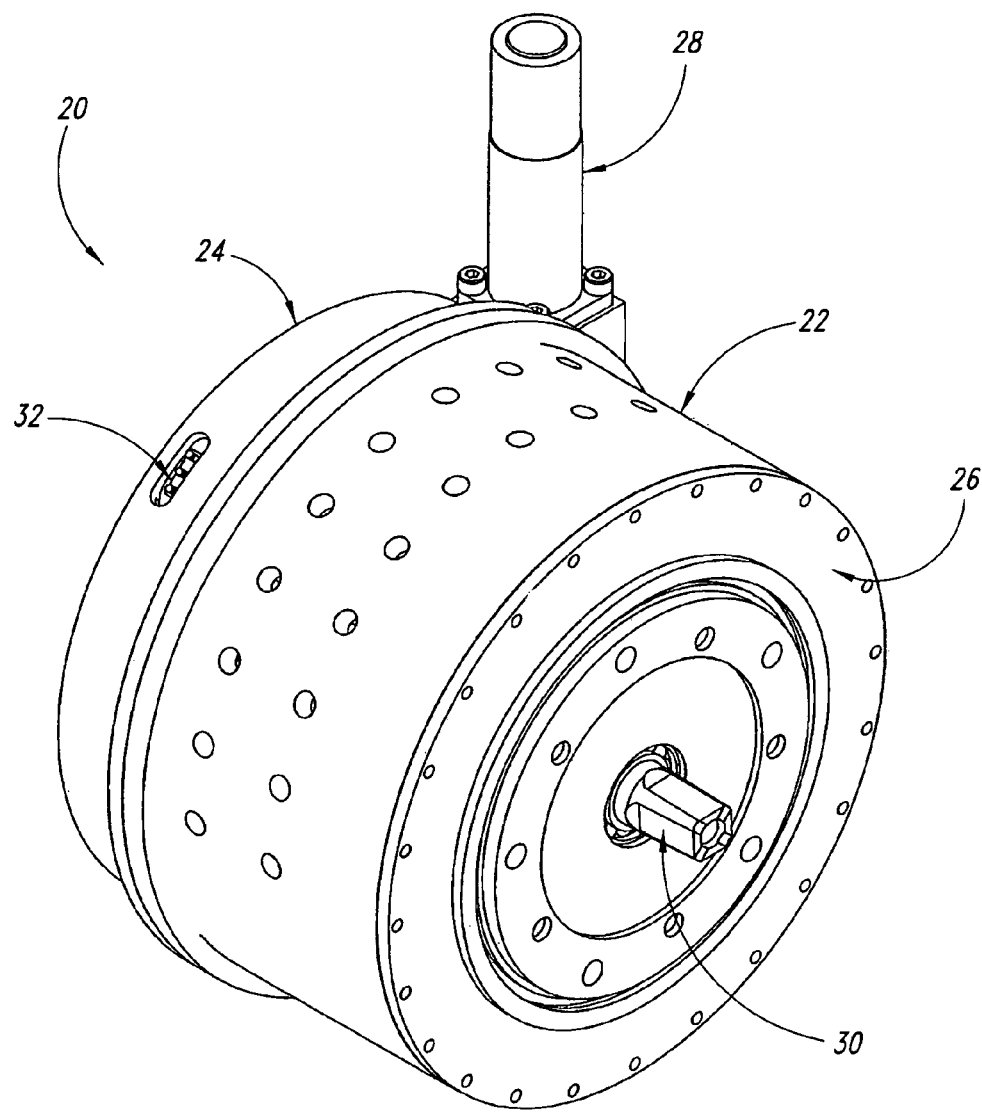
FIG. 2 is an isometric view of an assembled transmission formed in accordance with the present invention.

Referring to FIG. 2, shown therein is a transmission 20 formed in accordance with one embodiment of the invention. The transmission 20 includes a cylindrical housing 22 having a left cover 24 and right cover 26 attached at each side thereof. Projecting up from the left cover 24 is a control unit 28, which will be described in more detail herein below. A main shaft or axle 30 extends through the transmission 20 for connection at each end to respective pedal cranks (not shown). A sprocket driver adapted to receive a sprocket and drive chain (not shown) coupled to the rear wheel of a bicycle in a conventional fashion can be provided. A receptacle 32 houses a limit switch to limit cam movement for maximum offset. There are wires from a controller on the handlebar (not shown) to the control unit 28 for controlling the cam offset, which gives the speed range change. The receptacle 32 is provided in the left cover 24 for receiving an electrical plug to carry the control signal from the controller (not shown) to the control unit 28.

Figure 3:
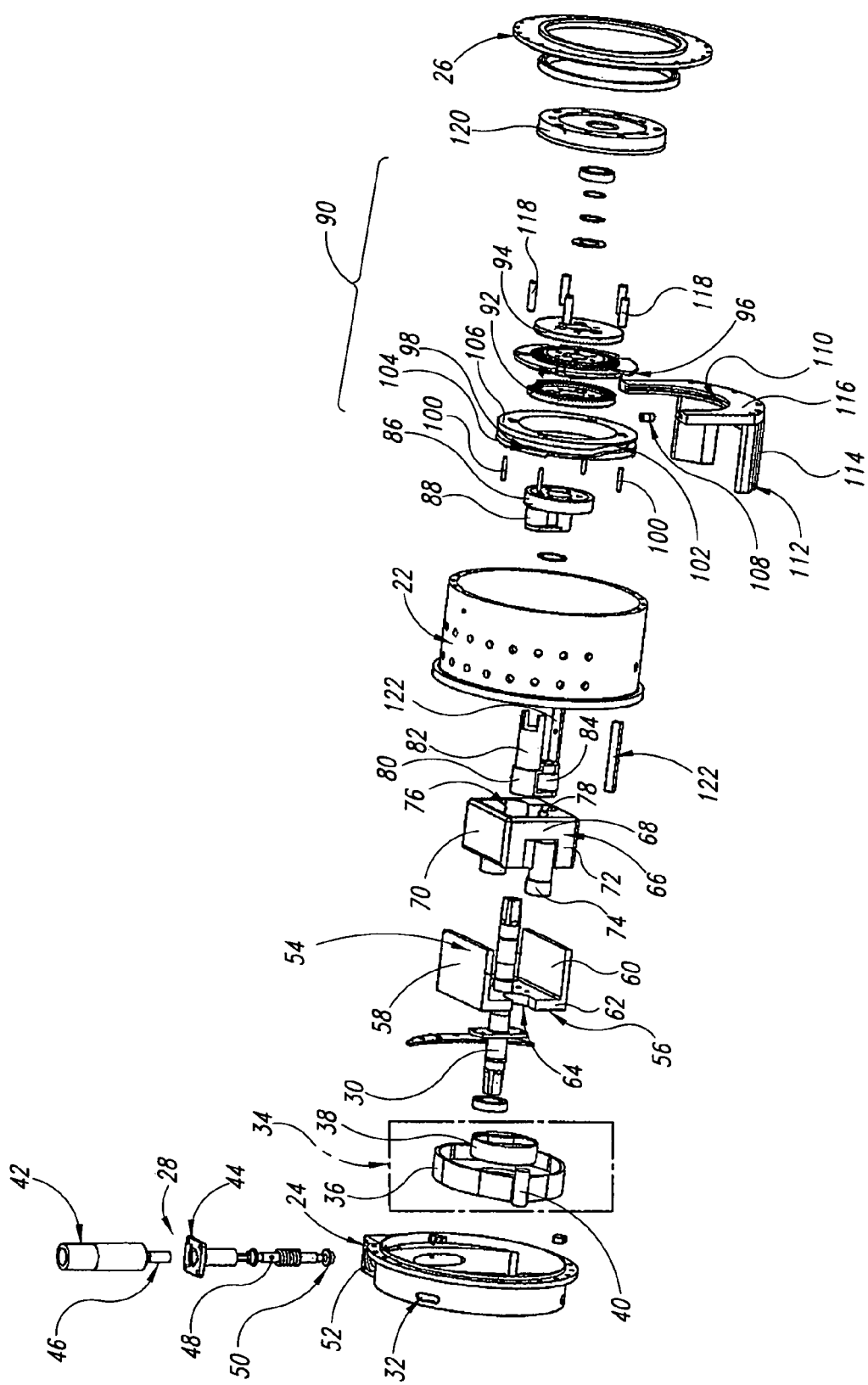
FIG. 3 is an exploded view of the overall assembly of the transmission of FIG. 2.
Figure 4:
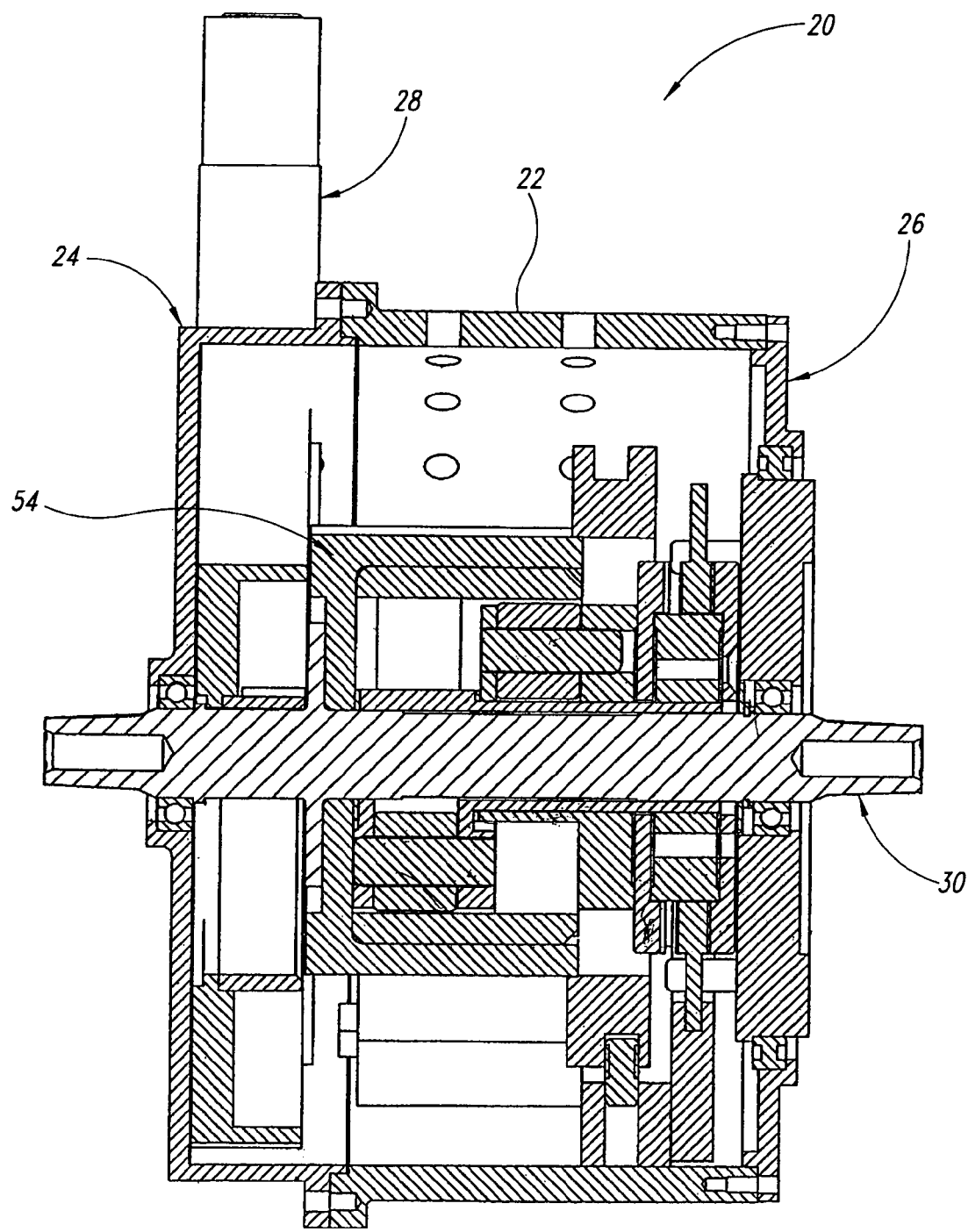
FIG. 4 is a cross-sectional view of the assembled transmission of FIG. 2.

Referring next to FIGS. 3 and 4, the external features of the transmission described with respect to FIG. 2 can be seen in both the exploded view of FIG. 3 and the cross-sectional assembled view of FIG. 4. The axle 30 extends through an opening (not shown) in the left cover 24. A cam assembly 34 is mounted inside the left cover 24. More particularly, the cam assembly 34 includes a cam eccentric 36 pivotally mounted to the left housing 24 and a cam ring 38 mounted over the axle 30 and within the cam eccentric 36.

Formed on one side of the cam eccentric 36 is a cylindrical sleeve 40 sitting in the left housing 24 such that the cam eccentric 36 will pivot thereabout. Pivotal movement of the cam eccentric 36 is accomplished by the control unit 28. The cam pivot point can be at any distance from the input shaft centerline.

As shown in this embodiment, the control unit 28 includes an electric motor 42 attached to a motor mount bushing 44 with a coupling 46 engaging a cam actuator worm 48. Preferably the electric motor 42 is a DC motor. A bushing 50 is placed over the projecting end of the cam actuator worm 48 when mounted in an actuator housing 52 formed on the left cover 24. The cam actuator worm 48 engages the cam eccentric 36 in a conventional fashion to control pivotal movement of the cam eccentric 36 about the pivotal mounting point at the sleeve 40. The control unit 28 is configured so as to be unable to be driven back by forces exerted on the cam assembly 34 during operation.

In a preferred embodiment, the fastening bolt position for the left cover housing 24 permits rotation of the left cover 24 by 15 degrees so that varied torque output can be produced and modified, ideally this is used only for testing. It also permits modification of the speed-up or speed-down portion of the torque cycle by varying the phasing between the end of the stroke of the cam eccentric 36 and the shift point between the clutches (described below).

Ideally, the cam actuator worm 48 is configured to fit with a gear tooth formed on the side of the cam eccentric 36. The DC motor 42 rotates the worm, which in turn moves the cam eccentric 36 up and down to vary the eccentricity between the axial centers of the axle 30 and the cam eccentric 36 with cam ring 38. Two micro-switches can be used to limit the eccentricity and to change direction of motor rotation when the cam eccentric 36 hits the micro-switch. The cam actuator worm 48 can also be operated manually with an adjustment handle should power to the DC motor 42 be interrupted or unavailable, such as could occur when batteries are dead.

The cam eccentric 36 moves the cam ring 38 in response to movement of the cam actuator worm 48 and the motor 42. The eccentricity between the cam center and the axle 30 decides the amount of the torque addition or subtraction. A prime mover, in this case a human rider, varies the amplitude of input torque in a plurality of heterodyne wave forms because the eccentric member 36 varies its radial position to the axel 30 and its angular velocity relative to the input rotation. The internal mechanism adds or subtracts torque, and therefore speed, against the load.

When the cam assembly 34 is at a zero eccentricity position, the transmission 20 operates as a direct drive with no internal linear shuttle motion.

As mentioned above, the cam 38 need not be circular because it does not rotate with the input shaft. Thus, its shape can be modified to modify the torque output rate, or it can be modified to give other than a direct relationship between the input and output rotation, if desired, including a nearly linear relationship between input and output.

As can be seen, the cam eccentric is pivoted at a point on the left cover 24 so that the cam actuator worm 48 moves the center of the cam eccentric 36 about the Y-axis and slightly about the X-axis from the origin that is at the center of the axle 30. This X-direction movement can effect a change in the point of the zero phase relationship between the moving parts and the maximum torque load. A cam disc can also be used with a rectangular carrier moving within a slot so as to effect movement in only the Y-direction to guide the cam on a linear path respective to the axle 30, as will be shown and described in more detail herein below. Linear slide movement is a alternative.

Formed on or attached to the axle 30 is a shuttle carrier 54 having a transverse plate 56 and first and second side plates 58, 60 extending from opposing ends thereof in a direction toward the right cover 26. On adjacent sides 62 are formed semicircular transverse slots 64.

A shuttle 66 is sized and shaped to be slideably received over the axle 30 and to mate with the shuttle carrier 54. The shuttle 66 includes a pair of opposing elongated side walls 68 connected together at their ends by parallel first and second side walls 70, 72, respectively. A pair of cam followers 74 extend from the shuttle 66 toward the shuttle carrier, one cam follower 74 formed on each of the elongated side walls 68 of the shuttle 66. The cam followers 74 are sized and shaped to be slideably received through the transverse slots 64 in the shuttle carrier 54 and to cooperate with the cam assembly 34. The shuttle 66 has a hollow interior 76 with an internal channel 78 formed in each of the first and second side walls 70, 72.

The shuttle 66 is configured to be slideably received within the shuttle carrier 54 so that the cam followers can move the shuttle 66 transversely with respect to the axle 30 in response to movement of the cam eccentric 36 in the cam assembly 34. Thus, as the axle 30 rotates with the affixed shuttle carrier 54, the engaged shuttle 66 will also rotate with the shuttle carrier, but the shuttle 66 can experience transverse movement as the cam followers move in the transverse slots 64 responsive to movement of the cam assembly 34. Cam followers move along the surface of the cam ring 38, and the slots 64 are just clearance for the cam followers described below.

A first shuttle arm 80 is slideably received over the axle 30 to independently rotate about the axle 30. More particularly, the first shuttle arm 80 includes an elongate shaft 82 that has a longitudinal axial bore sized and shaped to be slideably received over the exterior of the axle 30. Attached to one end of the shaft 82 is a first follower 84 sized and shaped to be slideably received within the channel 78 formed in the second side wall 72. In this embodiment, the first follower 84 consists of a roller that is mounted to rotate about an axis parallel to the longitudinal axis of the elongate shaft 82. A second shuttle arm 86 with pass-through assembly is mounted over the axle 30, and it includes a second follower 88 in the form of a roller that is slideably received within the channel 78 in the first side wall 70 in the same manner as the first follower 84 is received in the channel 78 in the second side wall 72. The second shuttle arm 86 rotates about an axis that is concentric with the axis of the elongate shaft 82 and with the axis of the axle 30. The first shuffle arm 80 and second shuttle arm 86 rotate about the axel 30 independent of each other and of the axle 30.

As the axle 30 rotates, the shuttle 66 rotates with the shuttle carrier 54 along with the first and second shuttle arms 80, 86. When the cam eccentric 36 has its longitudinal axis in alignment with the longitudinal axis of the axle 30 (and hence with the longitudinal axis of the first and second shuttle arms 80, 86) there is no relative movement between the axle 30, the shuttle 66, and the first and second shuttle arms 80, 86. However, as the cam eccentric 36 is pivoted by the control unit 28 to be out of axial alignment with the axle 30 in either direction, the cam followers 74 will move rotationally along the cam ring 38 surface, and the shuttle 66 will laterally reciprocate or oscillate as it rotates with the axle 30. This lateral oscillation of the shuttle 66 will cause the first and second shuttle arms 80, 86 to repeatedly counter-rotate with respect to each other.

The clutch assembly 90 includes an inside clutch disc 92, an outside clutch disc 94, and a clutch shifter 96 positioned therebetween. The clutch assembly 90 also includes a circular clutch cam 98 that is connected to the shuttle carrier 54 via four pins 100. On an outside surface of the clutch cam 98 is formed an annular groove 102 that on the first circular half of the clutch cam 98 is positioned toward the left side 104 of the clutch cam 98 and on an opposing circular side of the clutch cam 98 is positioned adjacent the right side 106 of the clutch cam 98. The groove 102 includes smooth transitions between the left and right sides 104, 106 of the clutch cam 98.

A follower 108 is sized and shaped to ride within the groove 102. The follower 108 is mounted on the clutch shoe assembly 112, and when riding inside the groove 102, the follower 108 moves the clutch shoe assembly 112 back and forth axially. The clutch shifter 96 is inserted into the U-shape groove 110 of the wall 116, and when the clutch shoe assembly 112 moves back and forth, it brings the 96 back and forth too to engage the clutch shifter 96 to either clutch disc 92 or

94. At an increased mode, the clutch selects the forward (faster) disc to engage while at a decreased mode, it selects the slower disc to engage at each half rotation of concentric shaft. The clutch shoe assembly 112 has an arcuate side wall 114 with a radius that is sized and shaped to enable the side wall 114 to be slideably received within the housing 22. A U-shaped transverse wall 116 extends radially from the arcuate side wall 114 and includes the aforementioned groove 110 in a face thereof.

Rotation of the clutch cam 98 results in axial oscillation of the cam follower 108, which in turn moves the clutch shoe assembly 112 axially back and forth. The clutch cam 98 is mounted on the shuttle carrier and rotated as the carrier rotates. It does not move axially. The clutch shifter 96 slides axially over the axle 30 in response to movement of the clutch shoe assembly 112. The clutch shoe assembly 112 rides on shoe sliders 122 mounted in the housing 122.

A sprocket drive 120 is directly connected to a sprocket (not shown) and is directly coupled to the clutch shifter 96 via five pins 118.

Each clutch disc 92, 94 is coupled to a respective first and second shuttle arm 80, 86. As the clutch cam 98 rotates in response to rotation of the axle 30, the clutch shoe assembly 112 moves the clutch shifter 96 into alternating engagement with one of either the inside and outside clutch discs 92, 94. Engagement of the clutch shifter 96 with the inside and outside clutch discs 92, 94 occurs at zero relative movement between the components, thus reducing stress and smoothing the engagement.

It is to be understood that alternative to the slotted shuttle, a pinned shuttle with slotted arms can be used. In another alternative, a shuttle with two racks and two sector gears can be used. The gear mechanism can be applied inside of the cam mechanism on the shuttle if the gear teeth are strong enough to carry the maximum torque. The rack does not have to be linear in order to modify the torque output rate. The shuttle is constrained to a linear motion that has two gear racks attached to it surrounding and engaging two pinion gears concentric with the pedal shaft. These gear racks are axially offset from each other to engage a pinion gear on opposite sides of the shaft. Each gear is attached to an overrunning clutch that drives another concentric common shaft connected to the output sprocket that through a chain drives the rear wheel.

In yet another alternative, a metal band and arms can be used. Two metal bands are attached to the inside of the shuttle instead of arms.

In the disclosed embodiment of the present invention, when there is no offset between the cam 38 and the axle 30, all the torque input through the axle 30 is transferred to the output and no torque split occurs. When offset exists between the cam 38 and the axle 30, partial torque input is translated to linear motion of shuttle through the followers 74 due to the offset while the balance of the input torque remains in the rotational motion. Then the linear motion is added to or subtracted from the rotational motion (depending upon the direction of offset) to give speed increase or decrease. The clutch system selects the proper clutch disc to engage the output. This system provides one-way rotation of the output through periodic engagement with each of the inside and outside clutch disks 92, 94. In other words, at each half cycle, the clutch shifter 96 lets only one clutch disk (92, 94) transfer torque from the clutch disk (92, 94) to the clutch shifter 96. The clutch cam 98 is directly connected with the shuttle carrier 54, and the clutch shoe assembly 112 slides along the shoe sliders 122.

The rocker arm or shuttle (a rocker arm with the pivot at infinity) acts as a lever with the pivot attached to the input shaft and rotating with it. The cam acts on one end of this lever and the other end acts at a radius on a concentric shaft to rotate it relative to the main shaft. The concentric shaft is coupled to the output by a clutch. If the cam is offset one way, the effect is to rotate the concentric shaft forward relative to the input shaft during the half cycle when its clutch is engaged or backwards relative to the input shaft if the cam is offset the other way. Because the lever rotates with the input shaft, the effect is to increase or decrease the output rotation relative to the input shaft. The second lever operates in a like manner during the second half cycle to give a total net increase or decrease of rotation relative to the input shaft during the whole cycle. Therefore the clutches are a mechanical analog to an electrical controlled rectifier (i.e. an SCR or equivalent). If only one lever etc. were used, the output would return to the starting point over a full cycle with no net change in the output relative to the input. The various methods described to perform each function, i.e. cam offset, lever, coupling to a concentric shaft, and clutch, can be mixed and matched to perform the same basic function as a transmission assembly.

In one embodiment, the assembly uses a pivoted cam plate to effect a rotation of the cam with translation. Currently the active side of the cam is approximately elliptical with the major axis on the 0 and 180 degree line (relative to the internal cycle) at zero offset. The rotation with offset moves one lobe of the ellipse out of phase with the internal cycle, which in the case of the speed increase mode gives a rapid initial acceleration of the rotation of the concentric shaft, which gives an output speed function closely approximating that of a circular sprocket on a normal bike. With no offset, the cam is not too different from a circular cam in feel to a rider because the ellipse on the active side of the cam has a low eccentricity. The inactive side of the cam merely serves to return the inactive lever to its starting position ready to assume its duties when its clutch is engaged during its half cycle.

Alternative to the use of the two clutch disks 92, 94 is a roller overrunning clutch that can be applied to make one-way rotation at each periodic cycle. A magnetic clutch could also be used in a small torque-carrying device. Alternatively, a roller clutch with active disengagement of each half cycle can also be used.

In use, the housing is fixed to a bicycle. It does not rotate with motion relative to the input but could be displaced fifteen degrees as discussed above, such as for testing purposes only, by adjusting the left cover 24 to modify the rate and position of the speed up or slow down portion of the torque cycle.

In operation, the left cover 24 thus contains a typical axle bearing (not shown), the DC motor 42, the motor mount bushing 15, and cam actuator worm 48. The left cover 24 remains stationary as the axle 30 rotates. The cam eccentric 36 is mounted on the left housing 24 and does not rotate with the axle 30. Because it does not rotate, the shape of the cam 38 does not need to be circular, and it can be shaped to periodic variations.

The shuttle carrier 54 and the shuttle 66 transfer torque from the axle 30 and rotate the clutch cam 98 to shift the clutch assembly axially and to operate in a one-way rotation mode. The shuttle 66 is rotated by the shuttle carrier 54 and is oscillated by the eccentricity of the cam assembly 34. The eccentricity of the cam assembly 34 determines the amount of radial displacement of the shuttle 66, thus adding or subtracting torque from the base torque carried by the axle 30. Torque is transferred from the carrier 54 and shuttle 66 to the first and second shuttle arms 80, 86 via the track rollers 84. The first and second shuttle arms 80, 86 transfer torque from the shuttle 66 to the clutch assembly 90.

The maximum degree of rotation of the first and second shuttle arms is a factor in determining the maximum and minimum gear ratio of the transmission. In a preferred embodiment, the inside first shuttle arm 80 is connected with the outside clutch disk 94, and the second shuttle arm 86 is coupled to the inside clutch disk 92. Because the two arms 80, 86 rotate in an opposite direction by oscillation of the shuttle 66, one of the two arms 80, 86 is engaged at any given time with the clutch shifter 96 to transmit and convert torque in only one rotational direction to the sprocket drive 120.

Figure 5:
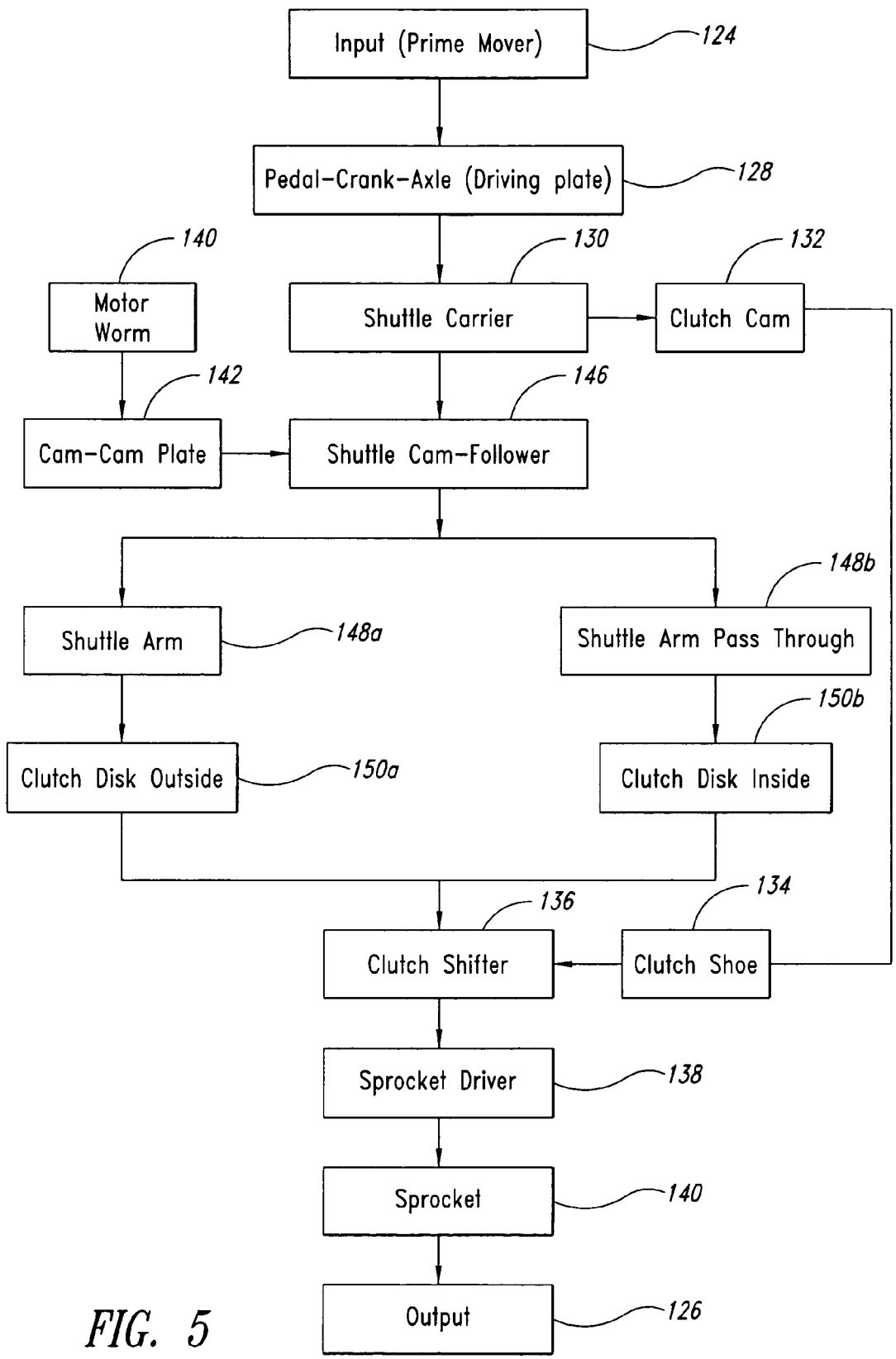
FIG. 5 is a flowchart illustrating the force flow through the transmission of FIG. 2.

Referring next to FIG. 5, shown therein is a flowchart illustrating the flow of force from the input (prime mover) 124 to the output 126. In this case, the prime mover providing the input would be a human, such as a bicycle rider. The torque input is received at the pedal crank in step 128 and transferred to the axle 30 as the rider pedals with their legs. The force at the axle 30 is transferred to the attached shuttle carrier 54 in step 130. Here, when the cam eccentric 36 is in alignment with the axle 30, there is no torque split.

When the motor 42 is operated to move the cam eccentric 36 and the cam ring 38 in steps 142, the shuttle 66 moves within the shuttle carrier 54 via the cam followers 74, as indicated in step 146. At this point, the first shuttle arm 82 and second shuttle arm 88 cooperate with the shuttle 66 to alternatingly transfer the torque from the shuttle to the inside and outside clutch discs 92, 94, as indicated in steps 148a, 148b and 150a, 150b. The resulting torque is then transferred to the clutch shifter 96 and thence to the output 126 as shown in previously-described steps 136, 138, and 140.

Figure 6:
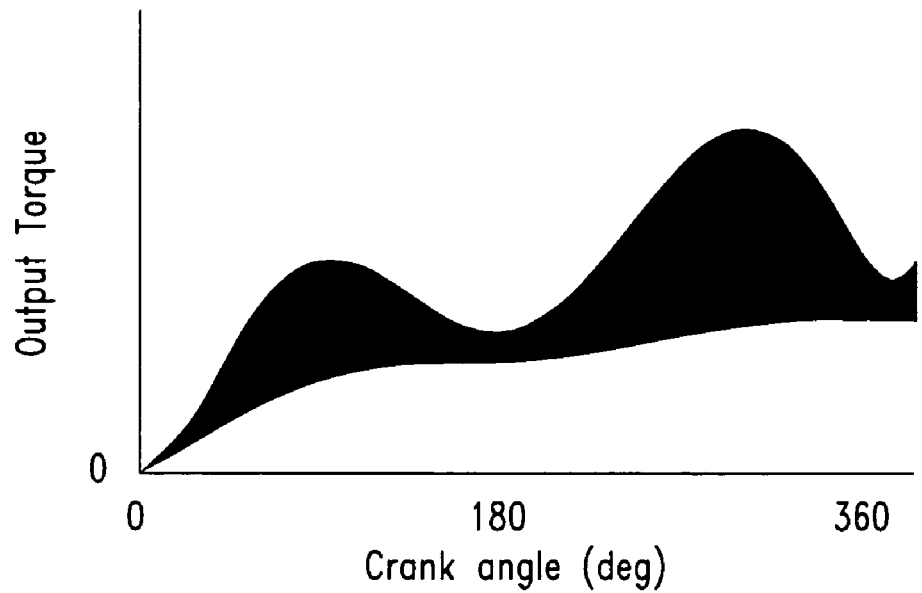
FIG. 6 shows the relationship between the pedal angle (crank angle) and actual torque/speed variation at different offsets of the cam eccentric of the present invention and in FIG. 7 of prior devices.
Figure 7:
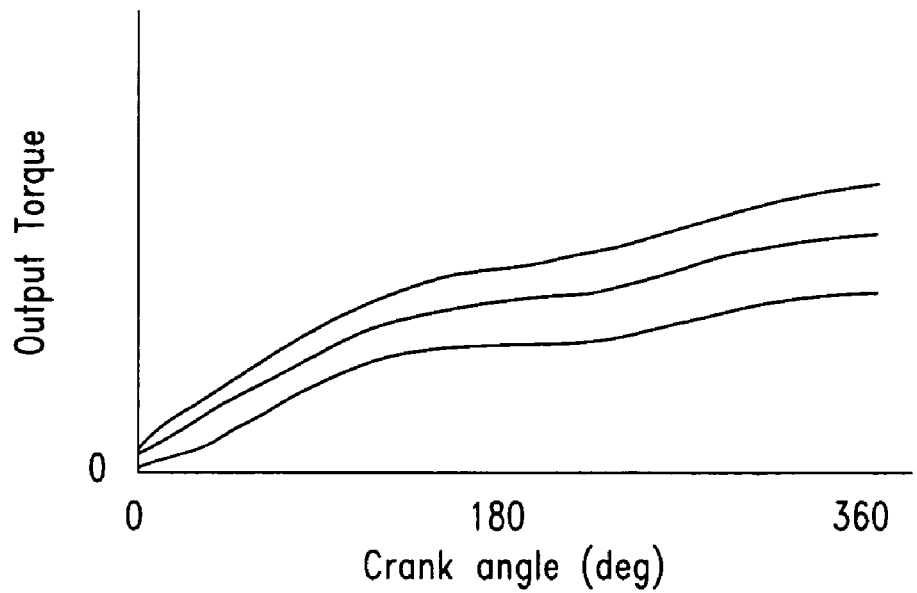

Referring next to FIGS. 6 and 7, FIG. 6 shows the relationship between the pedal angle (crank angle), with zero degrees representing a pedal at the top of the stroke and thence through its stroke to the average torque/speed increase and actual torque/speed variation at different offsets of the cam eccentric 36 in the transmission described above. At or near the top and bottom of each pedal stroke, the transmission ratio is at or near unity, without output rotation added or subtracted during the pedal stroke to give a net average ratio change. With proper cam shape the ration is not unity but is about the same from approximately 350° to 190°s giving an almost linear relationship of input to output. FIG. 7 shows the torque/speed output with a typical multi-sprocket bicycle transmission.

An important feature of the present invention is the zero relative velocity between the inside and outside discs 92, 94 with respect to engagement and disengagement from the clutch shifter 96. More particularly, when the cam assembly 34 is no longer in axial alignment with the axle 30, the shuttle 66 oscillates back and forth in the shuttle carrier 54. The oscillation of the shuttle 66 causes the first and second shuttle arms 82, 86 to rotate back and forth. In other words, as the shuttle 66 rotates with the shuttle carrier 54 and the axle 30 through the first 180 degrees of rotation, the first and second shuttle arms 82, 86 counter-rotate in a first direction with respect to each other; and as the shuttle 66 and shuttle carrier 54 with the axle 30 rotate from 180 degrees through 360 degrees, the shuttle 66 oscillates to cause the first and second shuttle arms 82, 86 to counter-rotate in an opposite direction with respect to each other. This in turn causes the respective inside and outside clutch discs 92, 94, which are continuously rotating with the axle 30, to adjust their speed of rotation. The clutch shifter 96 engages one or the other of the inside and outside discs 92, 94 when the discs 92, 94 have essentially a zero relative velocity with respect to the clutch shifter 96. This reduces the stress on the components and provides a smoother flow of the torque from the axle 30 to the sprocket driver 120.

In summary, the foregoing embodiment includes generally the torque input shaft or axle 30; the coaxial cam assembly 34 with the cam eccentric 36 rotatably fixed to the housing with adjustable eccentricity relative to the axle 30; a cam eccentricity adjuster in the form of the DC motor 42 and cam actuator worm 48 that is incapable of being back-driven; two coaxial shuttle arms 82, 86 mounted about the axle 30 with oppositely disposed levers (or rollers 84, 88) on one end and clutch input devices (inside and outside discs 92, 94) on the other end; two oppositely disposed cam followers 74 with a sliding or pivoting attachment to the axle 30 that are also linked to the first and second shuttle arms 80, 86 at a fixed or variable radius, all rotating with the axle 30; and a clutch assembly 90 that alternatingly connects to the coaxial first and second shuttle arms 80, 86 via the inside and outside clutch discs 92, 94 for 180-degree intervals of the axle 30 rotation relative to the housing 22.

Figure 8:
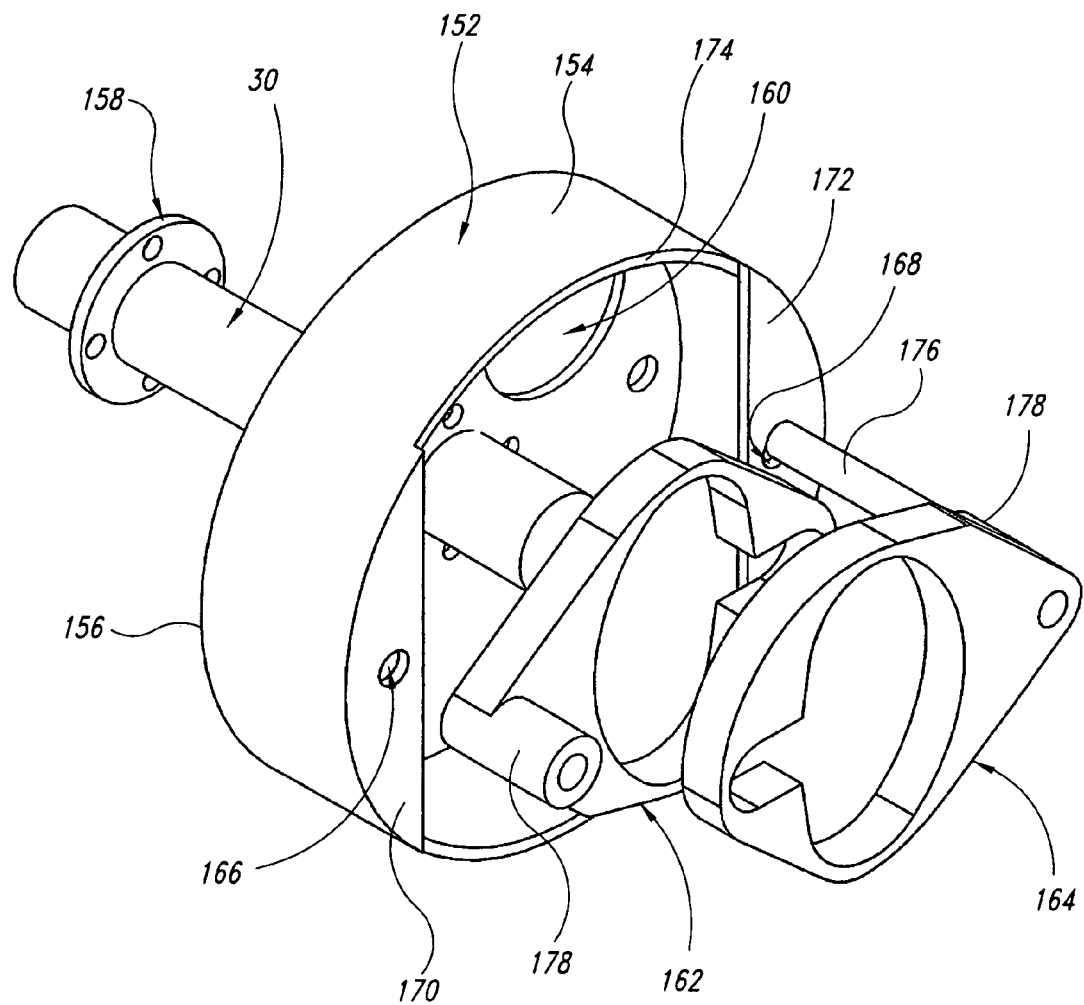
FIG. 8 is an enlarged exploded isometric view of a cam and rocker arm assembly.

Referring next to FIG. 8, illustrated therein is an alternative embodiment of a shuttle guide and shuttle arrangement wherein the axle 30 is coupled to a circular guide 152 that has a cylindrical wall 154 with a first end 156 attached to an end plate 158. The end plate 158 is fixedly attached to axle 30 and includes two diametrically opposed openings 160. First and second rocker arms 162, 164 are pivotally mounted to the circular guide 152 at pivot points 166, 168, which consists of openings formed in semicircular plates 170, 172 attached at opposite sides of the second end 174 of the circular wall 154. Each rocker arm 162, 164 includes a cylindrical sleeve 178, respectively, formed thereon to receive an axel pivot pin (not shown) that in turn is attached to the pivot points 166, 168. Each rocker arm 162, 164 has a cam follower 176 in the form of a cylindrically-shaped extension that is sized and shaped to extend through the matching opening 160 in the end plate 158 of the circular guide 152 to cooperate with the cam assembly 34.

Thus, when the cam assembly 34 is moved out of axial alignment with the axle 30, the cam followers 176 cause each of the rocker arms 162, 164 to pivot about the pivot points 166, 168.

Each rocker arm 162, 164 includes an opening 180 sized and shaped to receive the first and second shuttle arms 82, 86 in a similar manner as the shuttle 66 described above in FIG. 3.

Figure 9:
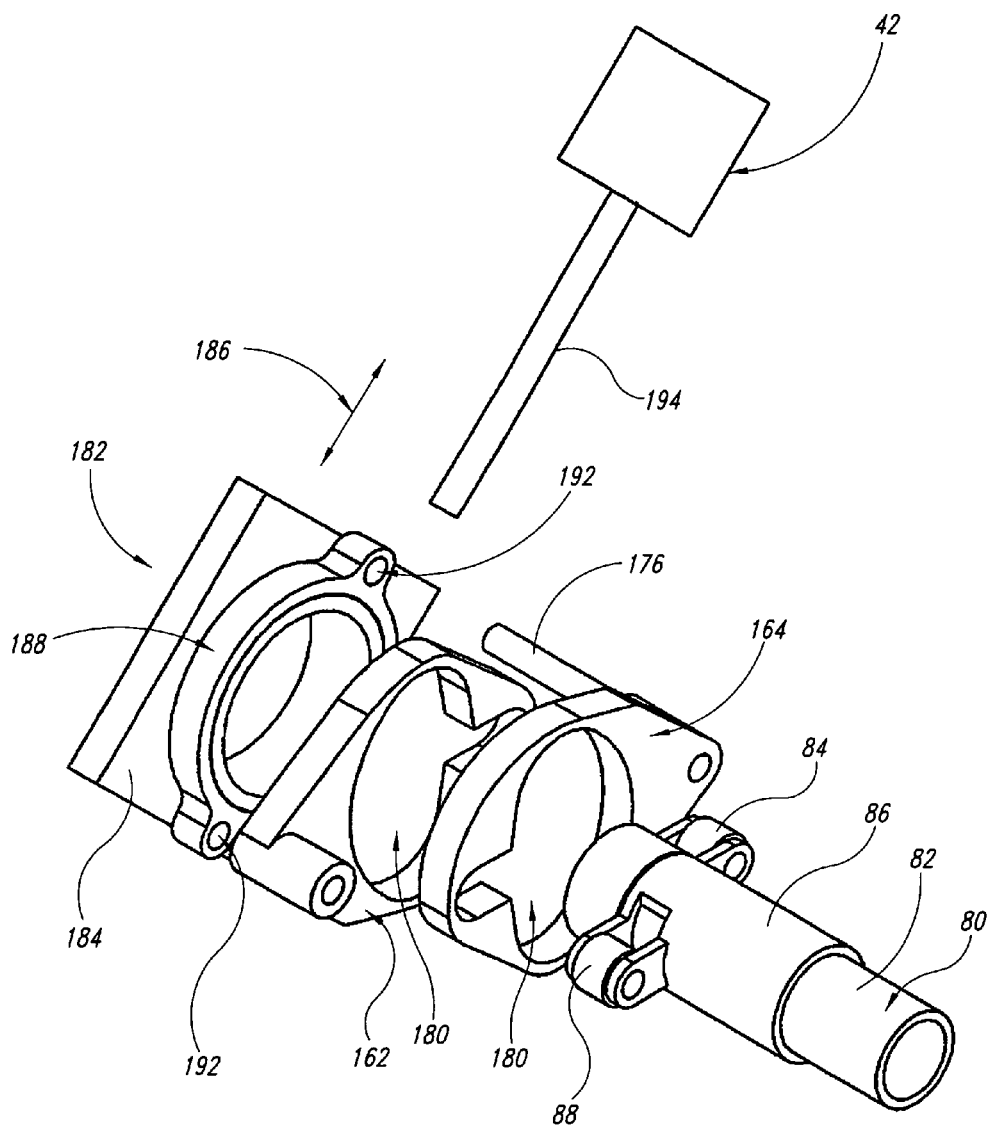
FIG. 9 is an exploded isometric view of another alternative embodiment of a shuttle assembly.
Figure 10:
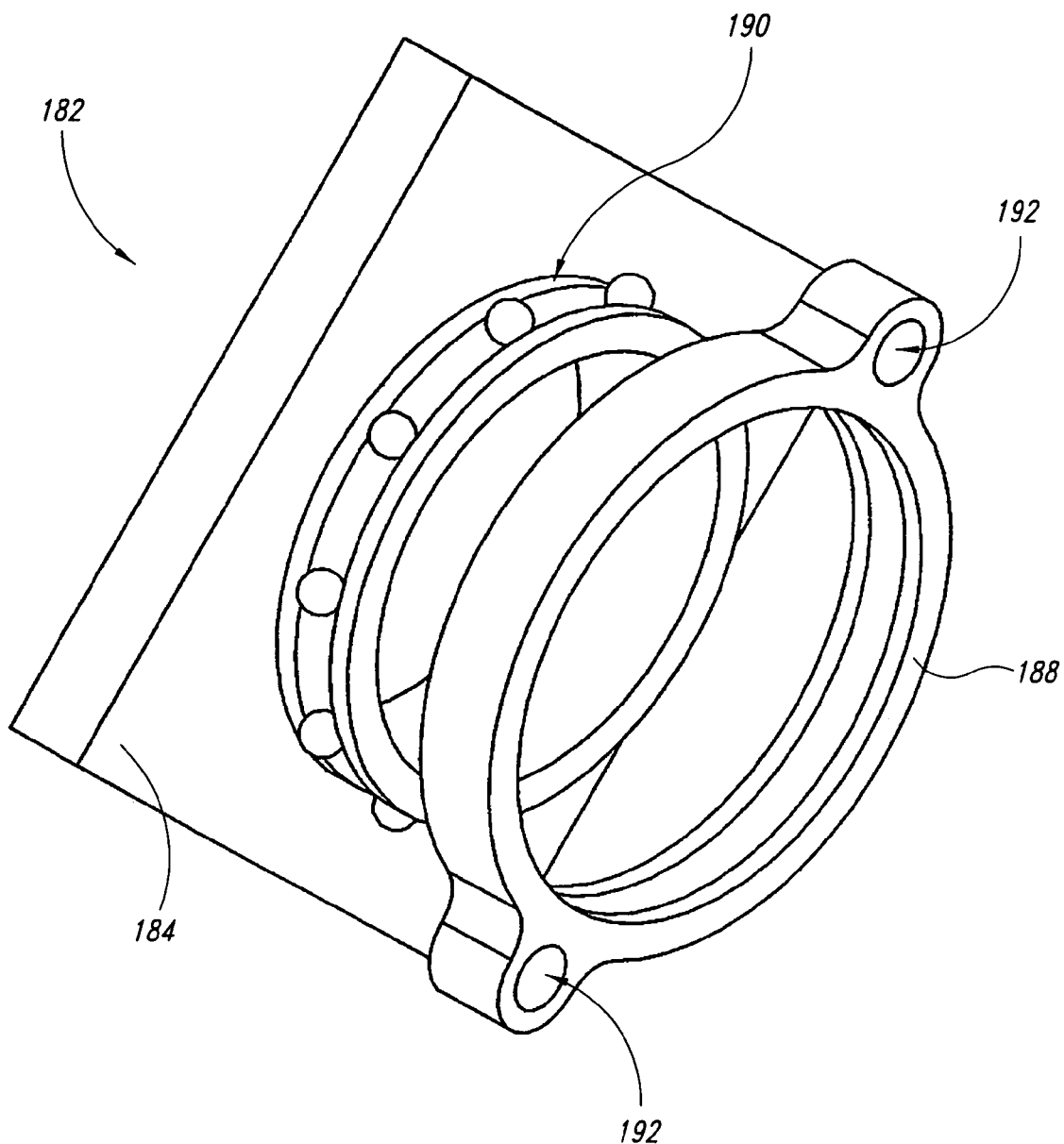
FIG. 10 is an enlarged exploded isometric view of a cam and cam plate assembly of the embodiment of FIG. 9.

Referring next to FIGS. 9 and 10, illustrated therein is yet another embodiment wherein the first and second rocker arms 162, 164 cooperate with a modified cam assembly 182 that includes a rectangular-shaped cam plate 184 slideably fixed to the housing (not shown) to slide in the direction indicated by the double-headed arrow 186. (It is to be understood that the alternative pivoting cam motion described above with respect to the cam assembly 34 of FIG. 3 could be adapted to this embodiment.) The cam plate 184 has a cam 188 rotatably mounted thereto with a bearing 190 (see FIG. 10). The cam 188 includes cam follower openings 192 formed on opposing sides thereof and sized and shaped to receive the cam followers 176 on the rocker arms 162, 164.

The motor 42 operates a link, designated here as 194, to push and pull the cam plate 184 so that the cam 188 is moved into and out of axial alignment with the axle 30. When the cam 188 is moved out of alignment, the rocker arms 162, 164 counter-rotate about their pivot points in the manner described above with respect to the embodiment of FIGS. 2-5.

Figure 11:
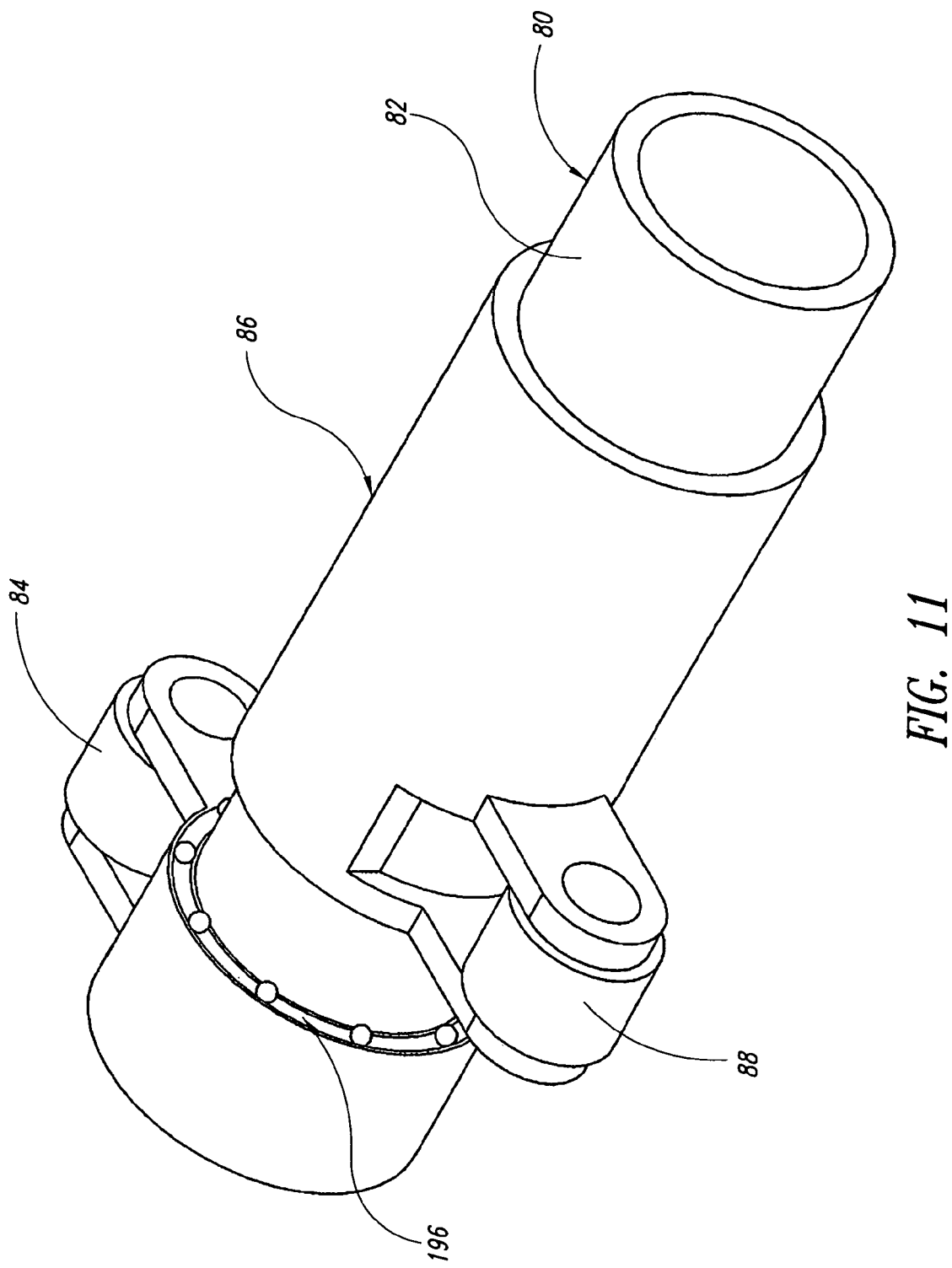
FIG. 11 is an enlarged isometric view of a shuttle assembly of the embodiment of FIG. 9.

FIG. 11 shows the assembly of the first and second shuttle arms 80, 86, which are acted upon by the shuttle or rocker arms. In this embodiment, the second shuttle arm 86 is slideably received over the shaft 82 of the first shuttle arm. A bearing 196, such as a thrust bearing, is the point of contact between the first shuttle arm 80 and the second shuttle arm 86.

Figure 12A:
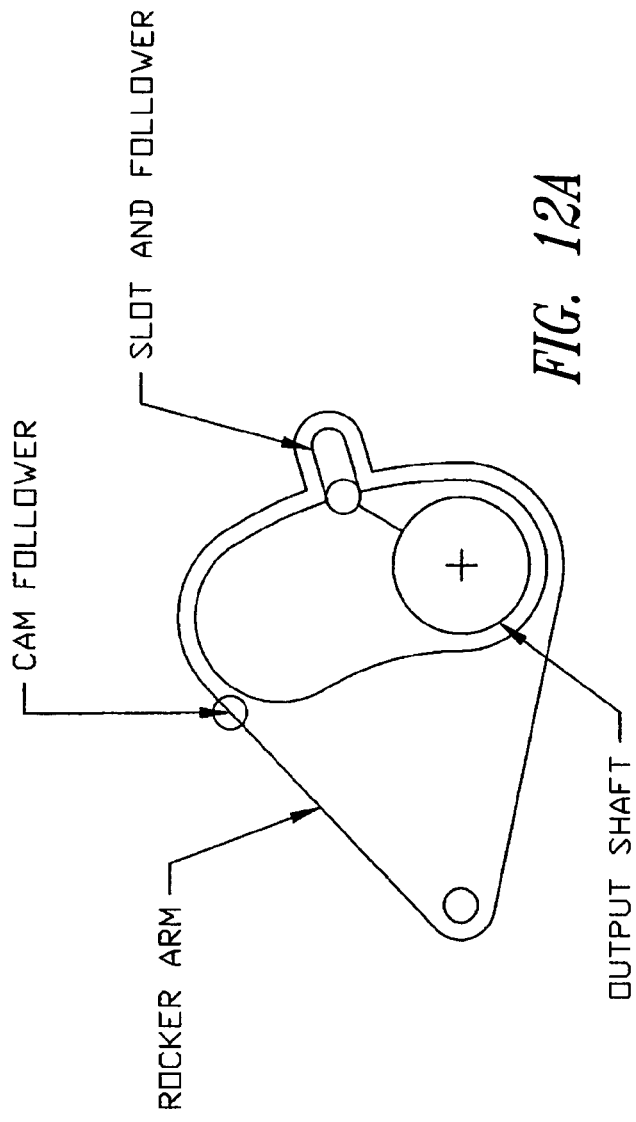
FIGS. 12A-12B are schematic representations of possible geometric relationships of the rocker arm, main shaft, and cam follower.
Figure 12B:
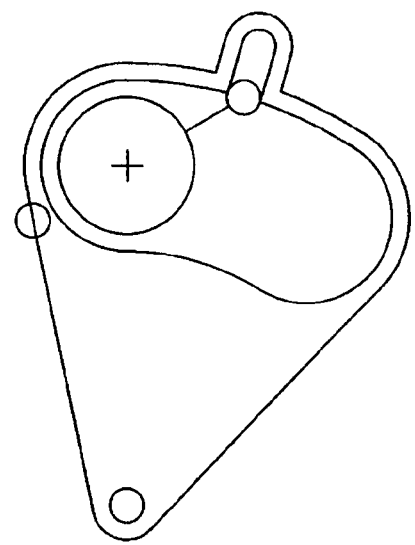

Referring next to FIGS. 12A and 12B, shown therein is a schematic representation of the geometries of the rocker arm, cam follower, and corresponding slot with follower. In FIG. 12A, the cam follower is moved by the cam assembly to one extreme of its range of motion, resulting in the rocker arm moving upward with respect to the output shaft, which is now located at the bottom of the opening in the rocker arm. The slot and corresponding follower correspond to the first shuttle arm 80 with first follower 84 showing how the output shaft or elongate shaft 82 is rotated. FIG. 12B shows the rocker arm moved to the other extreme in response to movement of the cam follower with a corresponding rotation of the output shaft in the opposite direction. These movements correspond to the oscillatory movement of the shuttle 66 described above in the first embodiment. These movements also correspond to the embodiments described in FIGS. 8 and 9 described above.

Figure 13A:
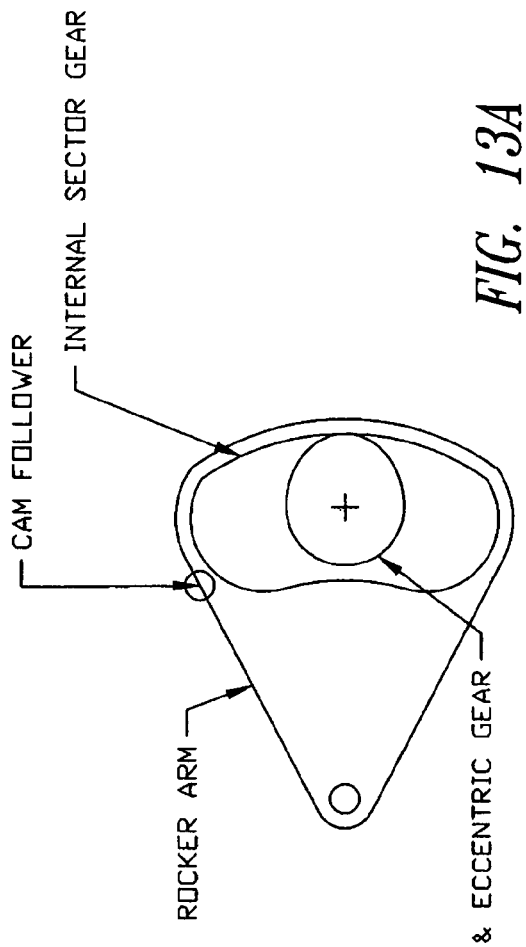
FIGS. 13A-13B are schematic representations of additional possible geometric relationships of the rocker arm, main shaft, and cam follower.
Figure 13B:
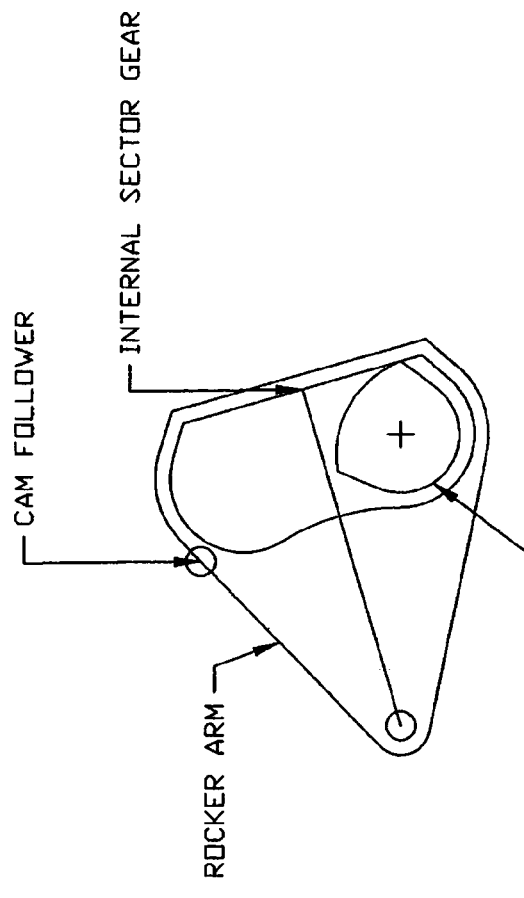

FIGS. 13A and 13B show modifications to the geometry of the rocker arm and output shaft utilizing an eccentric gear meshing with an internal sector gear on the opening in the rocker arm. The geometry of the opening in the rocker arm can be changed as well as the geometry of the eccentric gear on the output shaft, as shown in FIG. 13B, to modify the output waveform. This permits accommodating the human input waveform, which can differ based upon the physical condition of the rider. This can also change the point of zero relative velocity with respect to the housing, providing different acceleration rates, torque output, and the like.

FIGS. 14A-14C disclose yet other embodiments of the rocker arm and output shaft geometries.

Figure 15:
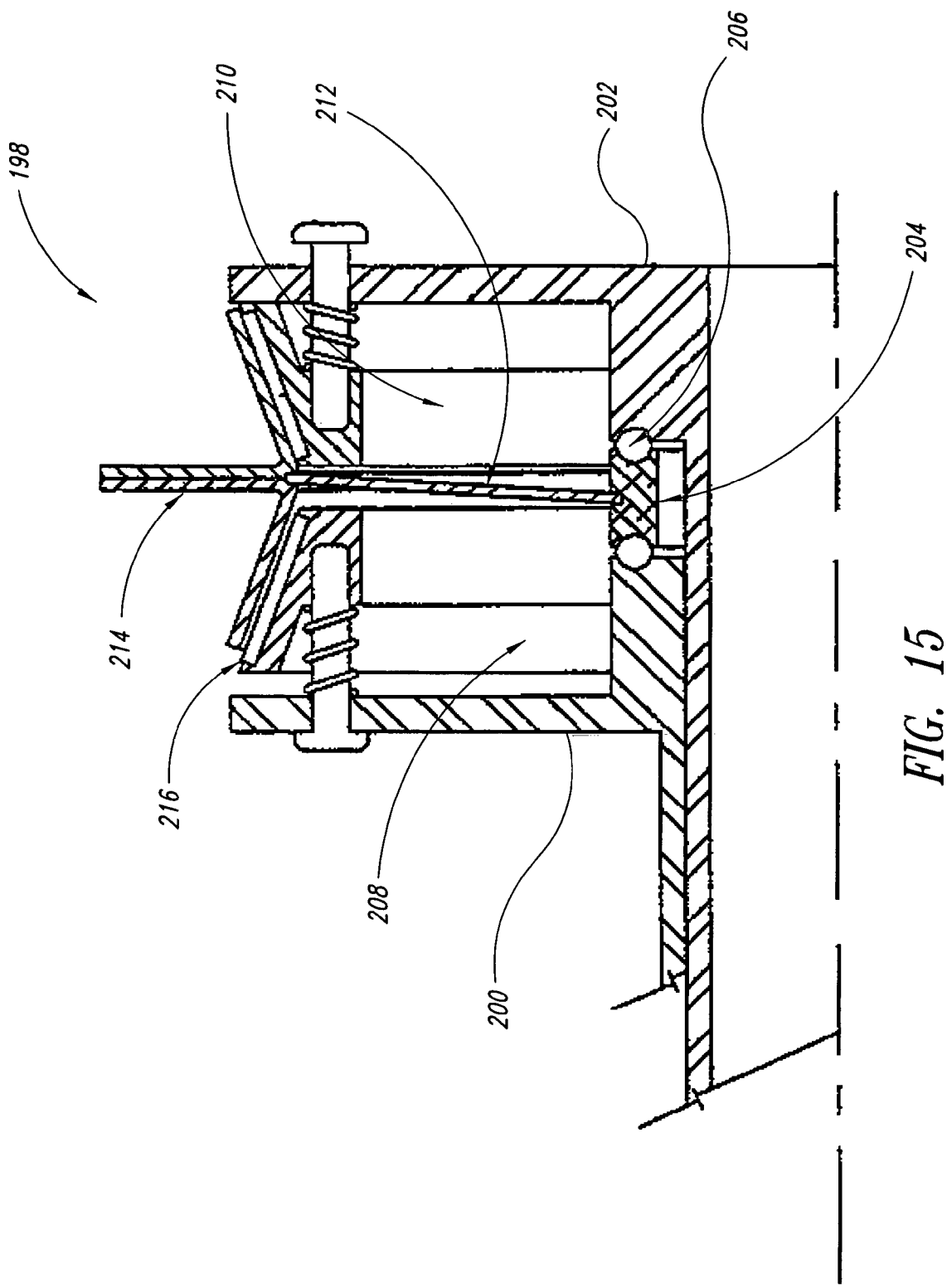
FIG. 15 is a partial view in cross-section of an alternative embodiment of a clutch assembly formed in accordance with the present invention using a bi-stable disk spring to effect engagement forces.

Turning to FIG. 15, shown therein is a partial cross-sectional view of an alternative embodiment of a clutch 198. Here, there is a first clutch driver 200 and corresponding second clutch driver 202 coupled together via a diaphragm spring hub 204 and corresponding thrust bearings 206. The clutch drivers 200, 202 are coupled to first and second driving wings 208, 210 via drive pins and springs, for example a bistable diaphragm spring 212. A driven clutch ring 214 engages friction material 216 when moved into engagement with either the first or second driving ring 208, 210. The shift motion is effected wherein the clutch cam moves the bistable diaphragm spring 212 to bring the driven clutch ring 214 into engagement with either the first or second driving ring 208, 210. First and second clutch drivers 200, 202 are moving rotationally, not axially.

Figure 16:
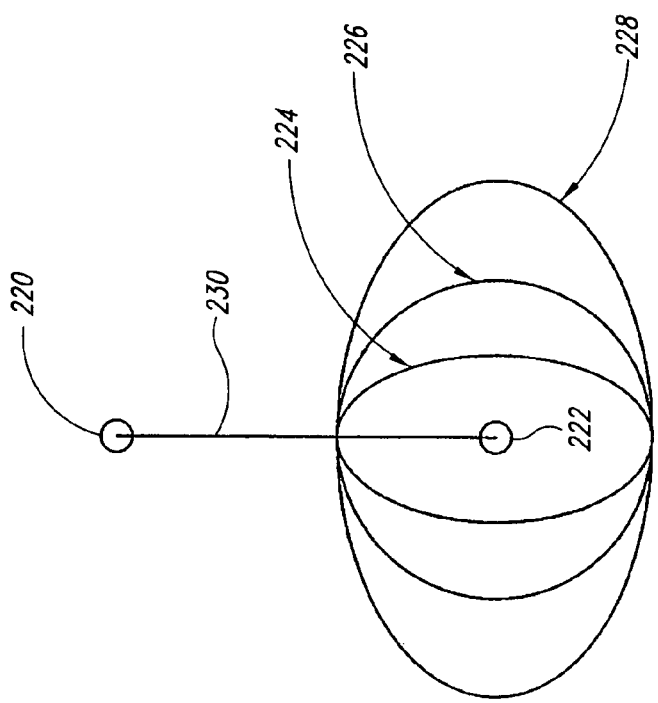
FIG. 16 is a schematic representation of the average ratio range of the transmission of the present invention.

Shown in FIG. 16 is an illustration of the relative torque feedback at the pedal at each degree of rotation. The first upper circle 220 represents the prime mover, in this case, the foot of the user. The second circle 222 represents the input shaft or axle 30. A line 230 connecting them represents the pedal crank. Unity is thus shown as the third circle 226, representing a 1:1 ratio. The upright ellipse 224 represents 0.33 percent of unity and is essentially a speed reduction ratio. The outer horizontal ellipse 228 represents approximately 1.67 percent of unity and equates to a speed increase. The radial distance to any curve thus equates to relative torque feedback at the pedal at each degree of rotation.

Figure 17:
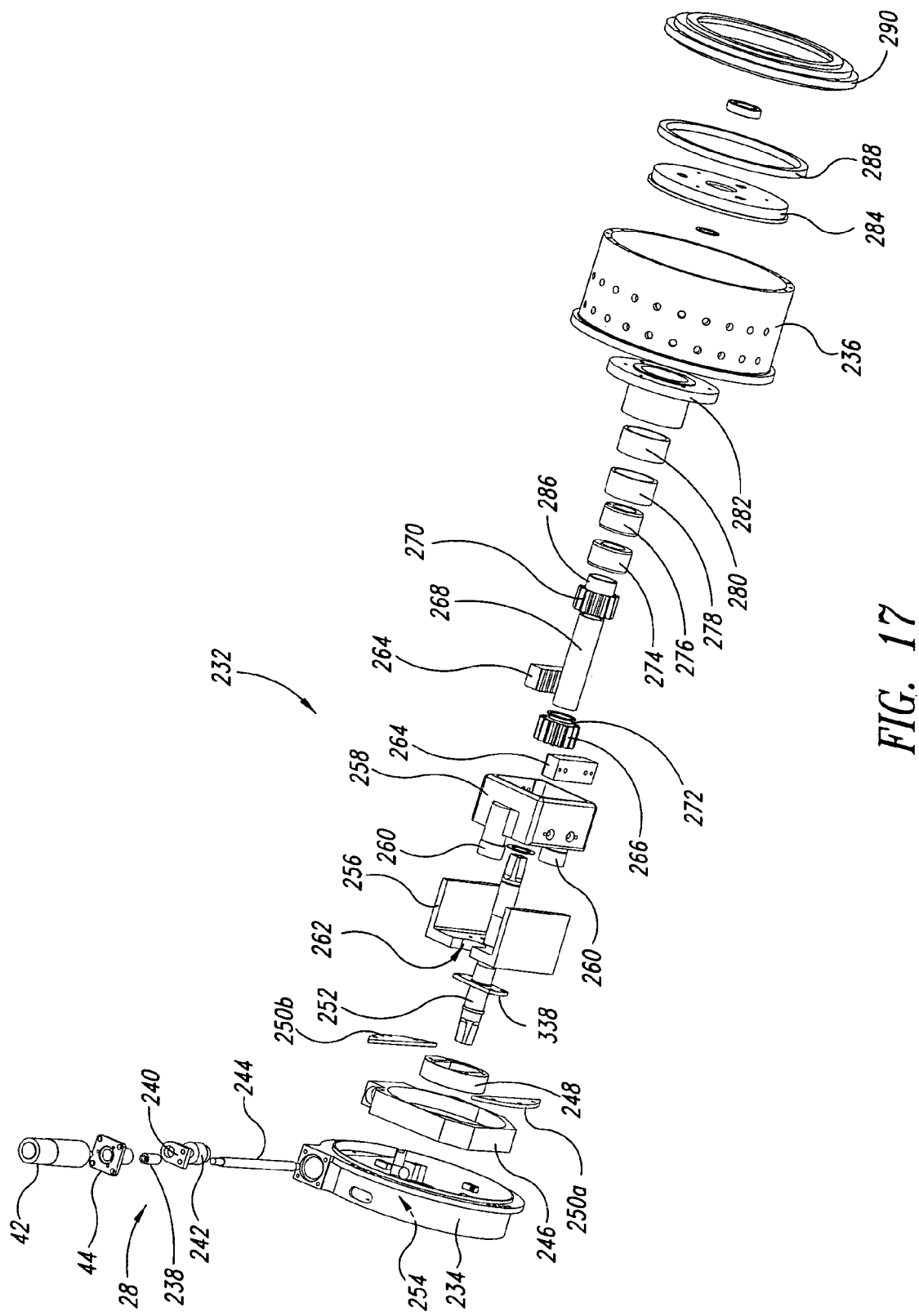
FIG. 17 is an exploded isometric view of a transmission formed in accordance with another embodiment of the present invention.

Referring next to FIG. 17, shown therein is another embodiment of a continuously variable transmission 232 wherein components corresponding to the transmission 20 described above are referred to with the same reference numbers. In this embodiment, the transmission 232 includes a left housing cover 234 and right housing cover 290, and the control unit 28 includes the motor 42 coupled to the motor mount 44. This control unit 28 further includes a coupling 238 cooperating with a nut block 240 and nut 242 to secure the motor 42 to the left housing cover 234 such that a drive screw 244 projects into the left housing cover 234 to cooperate with a cam plate 246. Placed within the cam plate 246 is a cam 248 held in place by first and second retainers 250a, 250b. An axle 252 projects through the cam 248, cam plate 246 and an opening 254 in the left housing cover 234 and is journaled in an appropriate bearing. The axle 252 is fixedly attached to a shuttle carrier 256 that cooperates with a shuttle 258 slideably mounted over the axle 252. A pair of cam followers 260 extend from the shuttle 258 and through corresponding openings 262 formed in the shuttle carrier 256 and ride on the surface of the cam 238.

Mounted in the interior of the shuttle 258 are a pair of rectangular rack spurs 264 having teeth inwardly facing to cooperate respectively with a circular arm gear 266 and a spur gear 270. The arm gear 266 is mounted to the left end of a circular arm shaft 268 having an inner race 276 mounted on the right end of arm shaft 268. The spur gear 270 is mounted to the left end of circular arm shaft 286 having another inner race 274 mounted on the right end of 286. A spacer 272 is positioned between the arm gear 266 and the spur gear 270. The arm gear 266 and the spur gear 270 are meshed with the respective rack spurs 264 that are offset mounted in the interior of the shuttle 258.

The first and second inner races 274, 276 are slid inside first and second roller clutches 278, 280, which are mounted on a roller clutch mounting 282 that is attached to a sprocket driver 284. The roller clutches 278, 280 cooperate with the arm shaft 268 and a shaft extension 286 on the spur gear 270 to connect the axle 252 to the sprocket driver 284. This connection is made via the spur gear 270 and the arm gear 266 meshing with the respective rack spurs 264 mounted in the shuttle 258 that engages the shuttle carrier via the cam followers 260 and the cam 248 mounted in the cam plate 246. A bearing 288 is placed over the sprocket driver 284, and the right housing cover 290 is configured for attachment to the housing 236 over the bearing 288.

In this embodiment, the arm gear 266 and the spur gear 270 rotate independently about the axle 252 as the axle is rotating in response to torque applied by a user to pedals (not shown) attached to the axle 252. The shuttle 258 also rotates about the axle 252, and the openings 262 provide clearance for the cam followers 260. The rotational movement of the shuttle 258 is not limited, only transverse linear oscillation of the shuttle 258 within the shuttle carrier 256 is allowed, which is limited (or controlled) by the offset of the cam 248 to the shuttle carrier 252.

Thus, as the axle 252 rotates, the shuttle 258 rotates with the shuttle carrier 256 along with the arm gear 266 and spur gear 270. When the cam plate has its longitudinal axis in alignment with the longitudinal axis of the axle 252 (and hence with the longitudinal axis of the arm gear 266 and spur gear 270), there is no relative movement between the axle 252, the shuttle carrier 256, and the shuttle 258 as well as the arm gear 266 and the spur gear 270 that are engaged with their respective rack spurs 264. However, as the cam plate 246 is pivoted about the pivotal axis, which in this embodiment is concentric with the longitudinal axis of the axle 252, whether the cam plate is rotated in either direction, the cam followers 260 will move back and forth within the respective transverse slot 262 in the shuttle carrier 256, forcing the shuttle 258 to laterally reciprocate or oscillate as it rotates with the axle 252. This lateral oscillation of the shuttle 258 will cause the arm gear 266 and spur gear 270 to repeatedly either counter-rotate or over-rotate with respect to the axle 252. This rotating motion is applied to the roller clutches 278, 280 that are engaged with the roller clutch mounting 282 for driving the sprocket driver 284.

In principal, the torque applied to the axle 252 by a user through pedals (not shown) is split by translation through the cam 248 and cam plate 246 cooperating with the shuttle 258. This torque is recombined through periodic engagement devices, in this case the rack spurs 264 cooperating with their respective arm gear 266 and spur gear 270 through the roller clutches 278, 280 and hence to the roller clutch mounting 282 and sprocket driver 284. This periodic engagement through the roller clutches 278, 280 (such as Sprague clutches) maintains actual continual variability in the translation of the applied force through the transmission 232 that is felt as a continuously variable transition between ratios by the user.

Figure 18:
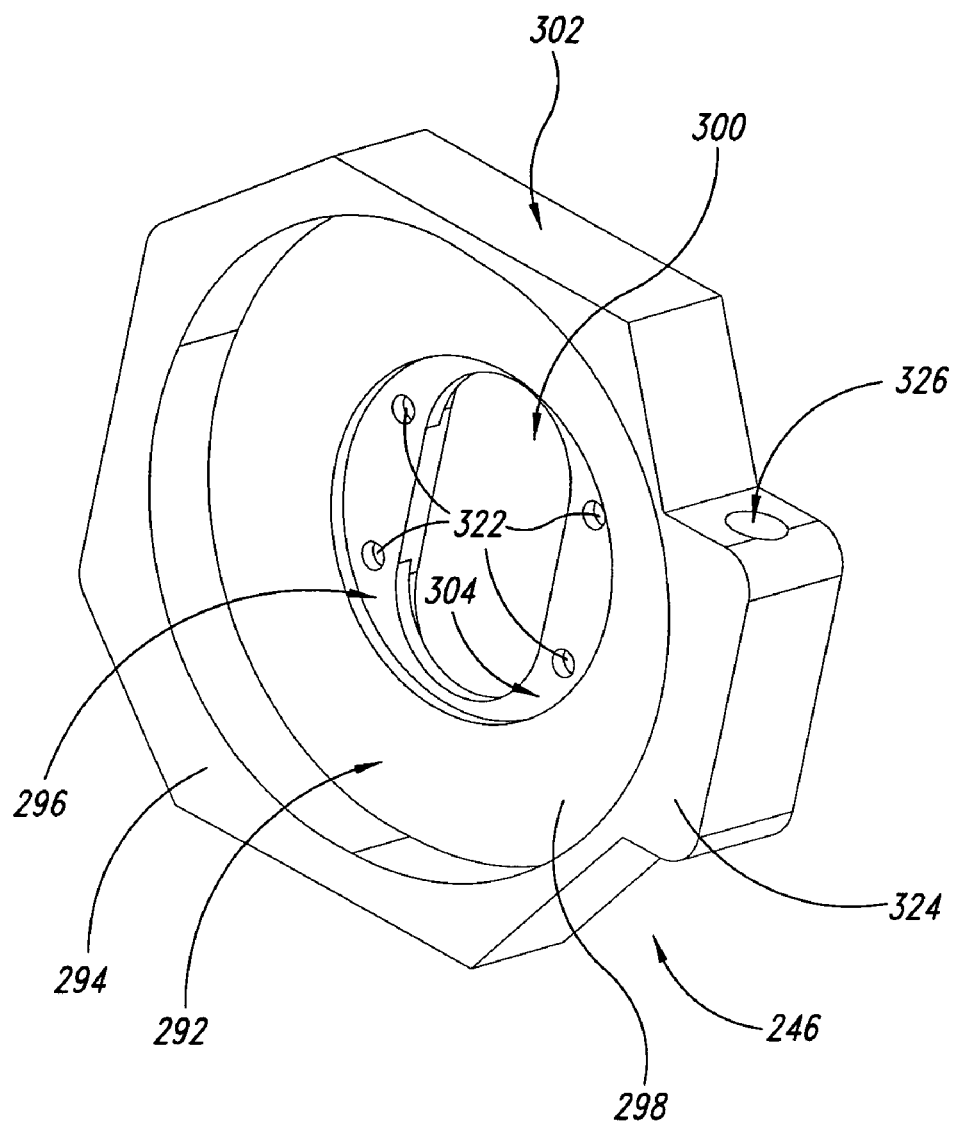
FIG. 18 is an isometric view of a cam motion plate formed in accordance with one embodiment of the invention.
Figure 19:
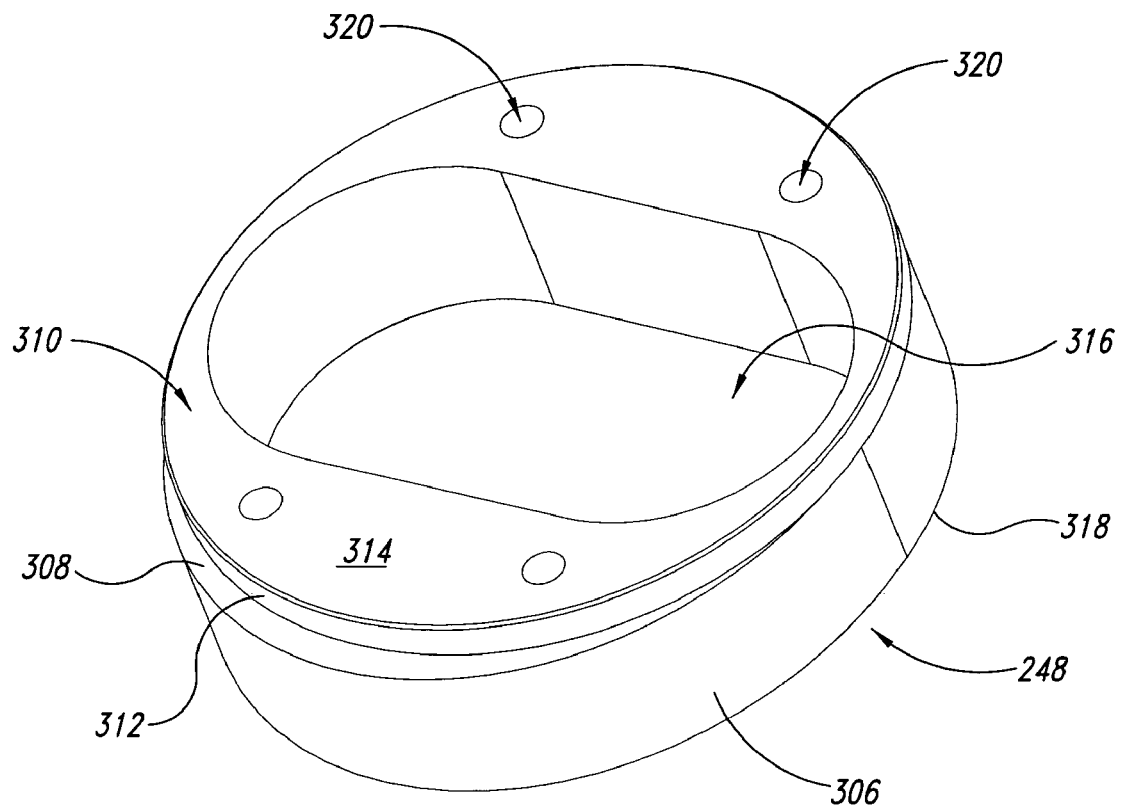
FIG. 19 is an isometric view of a cam formed in accordance with one embodiment of the invention.
Figure 20:
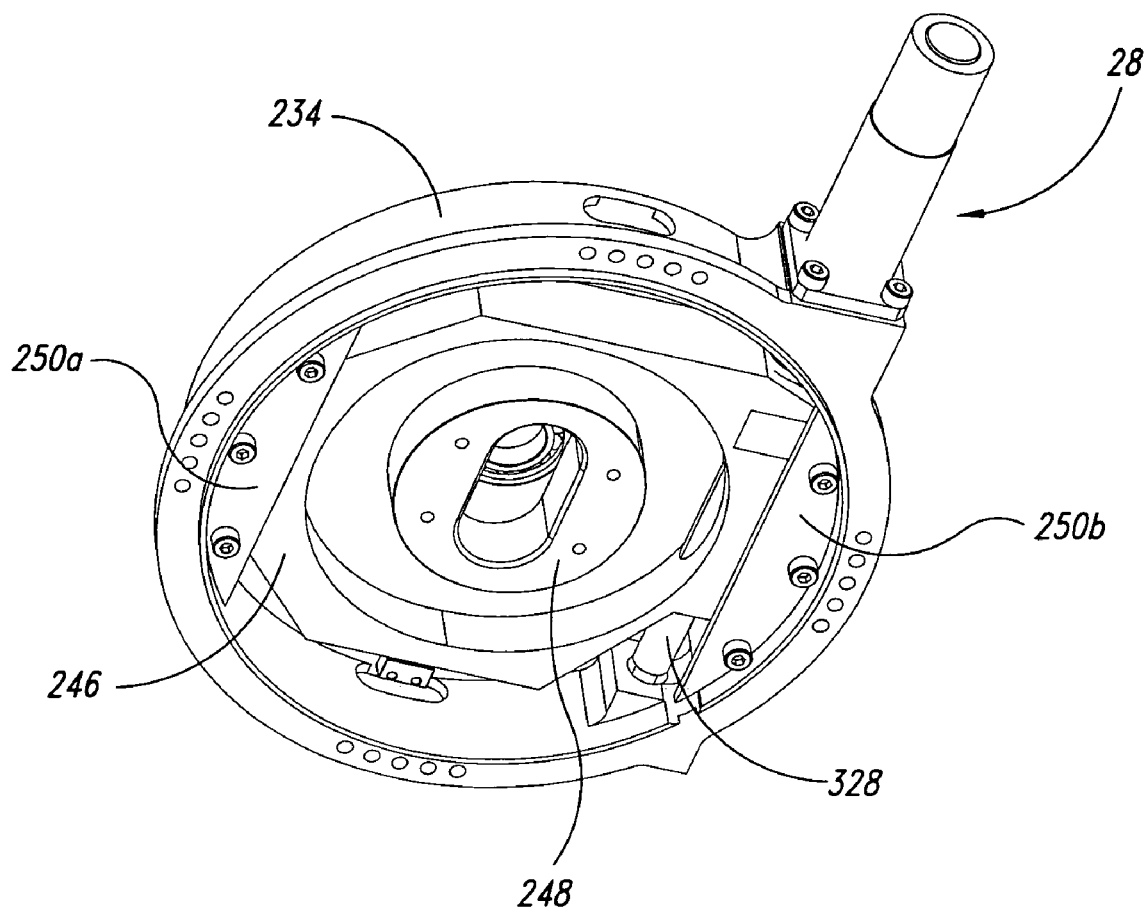
FIG. 20 is an isometric view of a left housing cover formed in accordance with the embodiment of the invention depicted in FIG. 17.

A more detailed description of selected components of this embodiment of the invention now follows, beginning with the cam plate 246 and cam 248, which are shown in greater detail in FIGS. 18-20.

In FIG. 18, the cam plate 246 is shown having a substantially circular external plan form shape with a substantially circular recessed opening 292 formed in a first side 294 that communicates with a second smaller circular opening 296 formed in an exposed face 298 in the first opening 292. The smaller second recessed opening 296 communicates with an oval-shaped opening 300 that opens to a second opposing side 302 of the cam plate 246. The second recessed opening 296 has an exposed surface 304 that is stepped down from the exposed face 298 of the first recessed opening 292. It is within the second recessed opening 296 that the cam 248 is received.

Referring next to FIG. 19, one version of the cam 248 is shown having a substantially circular plan form exterior shape defined by an annular exterior wall 306. Extending from a first surface 308 of the cam 248 is an circular-shaped step 310 defined by a circular exterior wall 312. The step 310 has an exposed face 314 that mates against the exposed surface 304 of the second opening 296 in the cam plate 246. An oblong opening 316 is formed through the step 310 and the main body 318 of the cam 248. Four threaded openings 320 are formed through the step 310 and the cam body 318, which are sized, shaped, and positioned to line up with four openings 322 formed in the exposed surface 304 of the second recessed opening 296 through which fasteners (not shown) are used to attach the cam 248 to the cam plate 246.

Referring back to FIG. 18, a mounting block 324 projects from the exterior sidewall 302 of the cam plate 246 and has a bore 326 formed therethrough for receiving the drive screw 244. In one embodiment, the bore 326 has internal threads that cooperate with external threads on the drive screw 244. Thus, as the drive screw 244 rotates, the cam plate 246 rides up or down the drive screw shaft, causing translational movement of the cam plate 246 relative to the axle 252. This translational movement is translated to the shuttle 258 via the cam followers 260 that cooperate with the cam 248.

FIG. 20 shows the left housing cover 234 with the cam plate 246 and cam 248 mounted therein. The control unit 28 is bolted to the exterior of the left housing cover 234, and the retainers 250a, 250b are bolted to the left housing cover 234 to hold the cam plate 246 within the left housing cover 234 without restricting translational movement of the cam plate 246 along the shaft 228 to which it is slideably mounted.

It is to be understood that the shape of the cam 248 can be varied to change the internal transfer function to give different input-to-output speed or torque relationships during each half cycle to suit the requirements of a particular application of the transmission.

Figure 22:
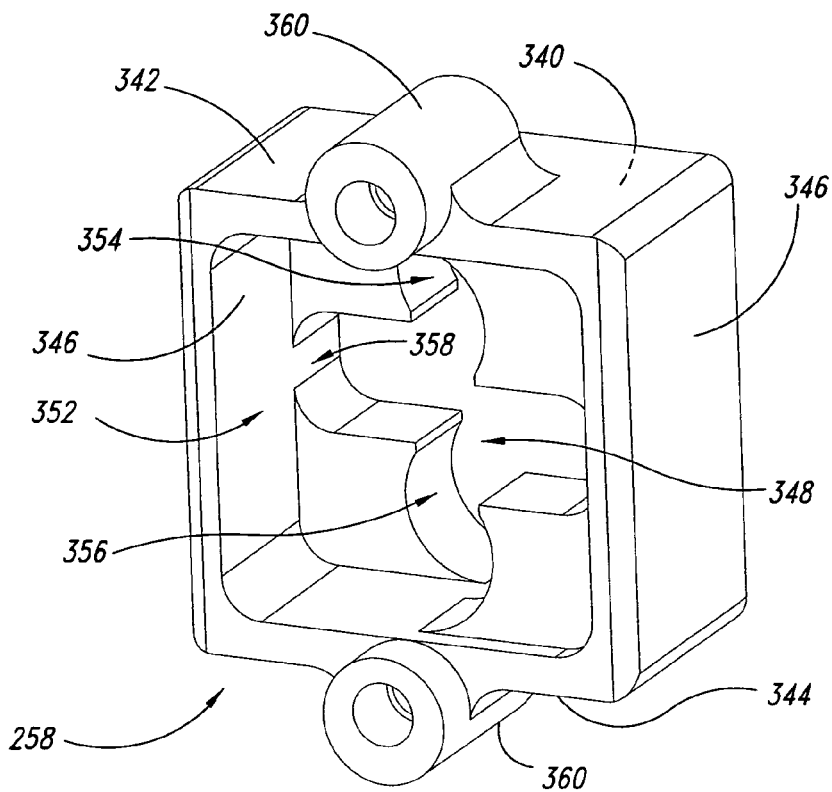
FIGS. 21 and 22 are front and rear isometric views, respectively, of a shuttle carrier formed in accordance with one embodiment of the invention.
Figure 21:
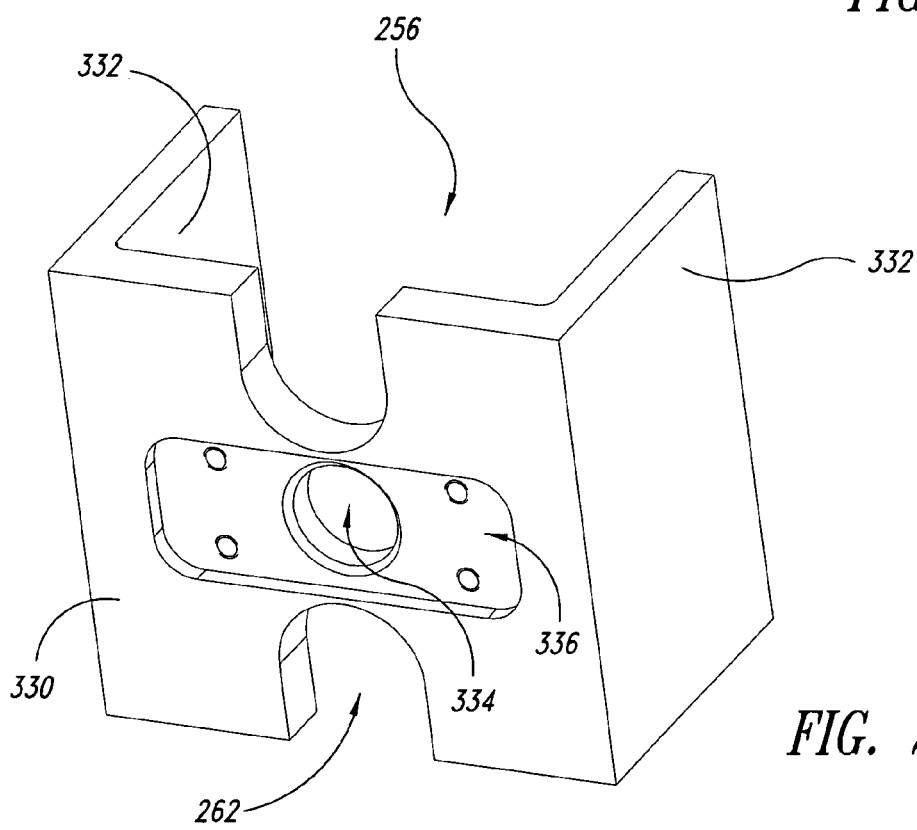

Referring next to FIGS. 21-22, the shuttle carrier 256 and shuttle 258 assembly are shown in more detail. In FIG. 21 the shuttle carrier 256 is shown having a back wall 330 with mutually parallel opposing sidewalls 332 extending therefrom. A central opening 334 is sized and shaped to be slideably received over the axle 252. A rectangular recess 336 is formed around the central opening 334 that is sized and shaped to receive a rectangular mount 338 fixedly attached to the axle (shown in FIG. 17). In this manner, the shuttle carrier 256 is fixedly mounted to the axle 252. The elongate openings 262 or channels are shown formed in the back wall 330 and oriented transversely to the longitudinal axis of the rectangular recess 336. It is to be understood that the shuttle carrier 256 can be affixed to the axle 252 by other conventional means, such as welding, or integrally formed therewith.

Referring next to FIG. 22, shown therein is the shuttle 258 having a back wall 340 integrally formed with a top wall 342, bottom wall 344, and sidewalls 346 that define a back opening 348 in communication through a hollow interior 350 with a front opening 352. The back opening 348 is formed to have a top lobe 354, bottom lobe 356, and a transverse side lobe 358. Extending off the front of the top wall 342 and the bottom wall 344 are cylindrical extensions 360 in which are mounted the cam followers 260.

Figure 23:
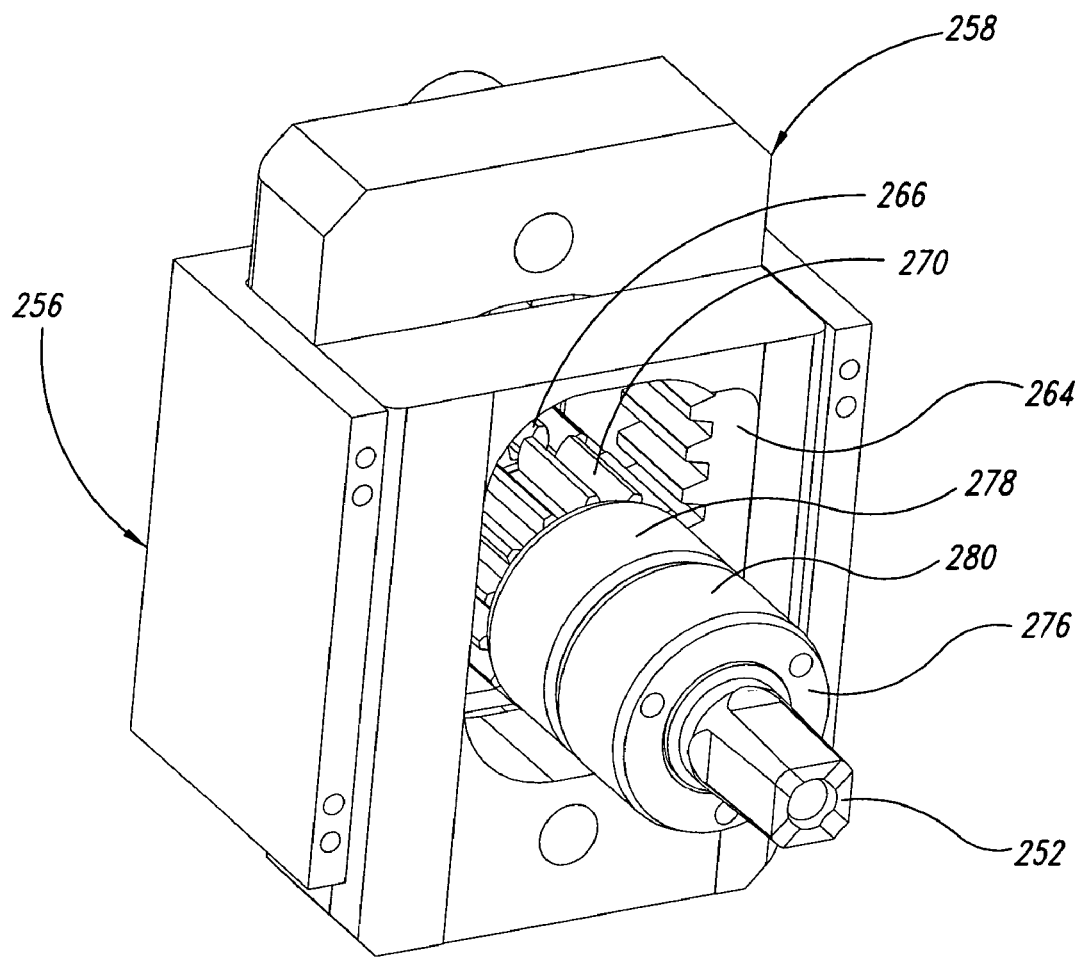
FIGS. 23 and 24 are front and rear isometric views, respectively, of a shuttle assembly formed in accordance with another embodiment of the invention.
Figure 24:
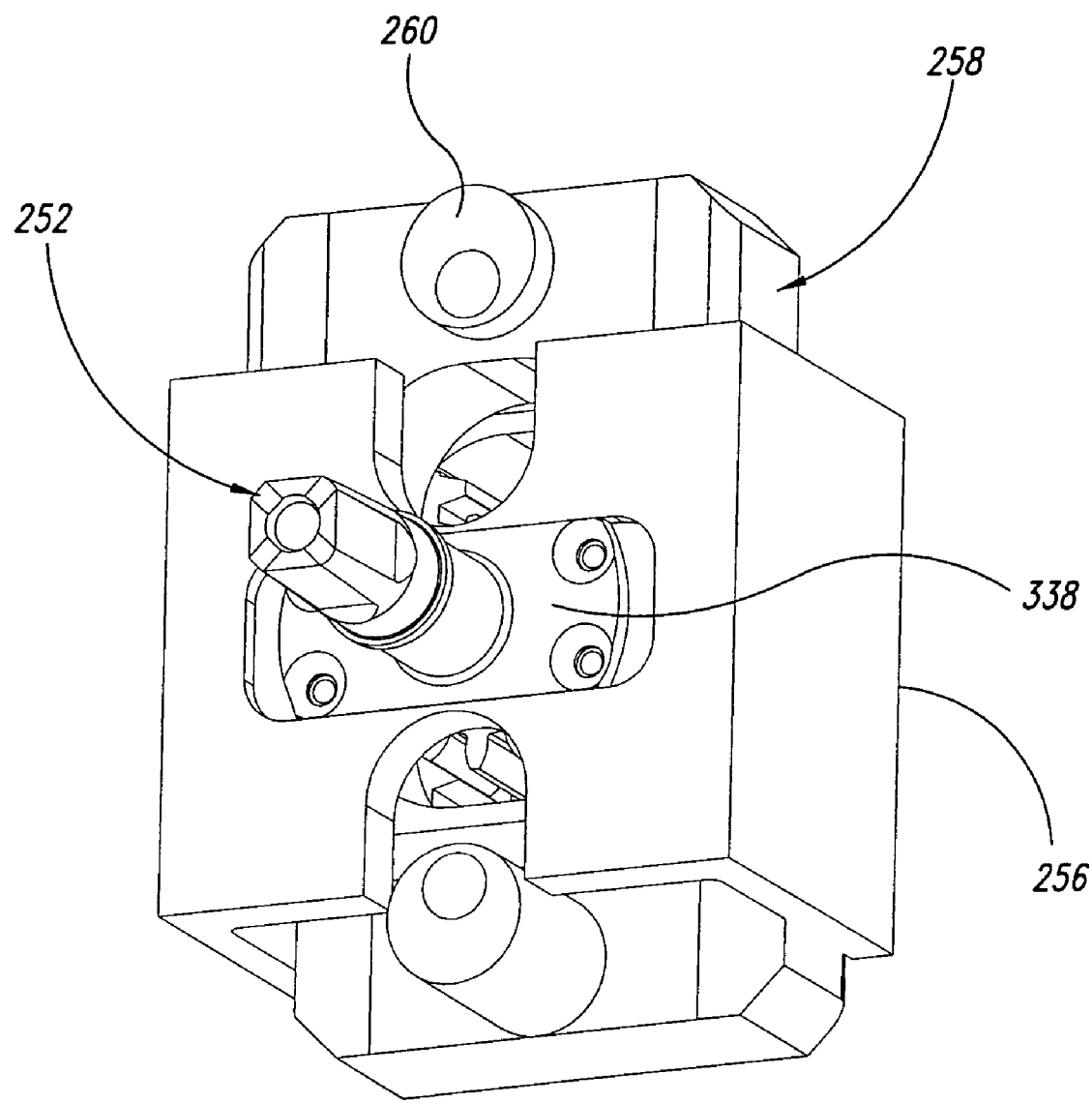

FIGS. 23 and 24 show front and back views of the assembled axle 252, shuttle carrier 262, shuttle assembly 258, along with arm gear 266, spur gear 270, and inner races 274, 276. The shuttle 258 shown in the embodiment of FIGS. 23 and 24 has a slightly different configuration from that shown in FIG. 22; nevertheless, it performs the same function to accomplish the same result. As can be seen in FIGS. 23 and 24, the shuttle assembly 258 is mounted to slide transversely within the shuttle carrier 256. It includes two shuttles, 259 and 261, which are divided from the original shuttle 258. The two cam followers are attached to the two shuttles, 259 and 261, respectively. This way, the two shuttles, 259 and 261, can have independent movement. This allows one shuttle to (driven by its cam follower) follow the active side of the cam while the other shuttle (driven by its cam follower) follows the back (inactive) side of the cam and returns to the start point and is ready for the active side of the cam. For the non-circular cam shape, which is the case in the current configuration, this design enables overlap between the transition point of the two cam followers, which provides smooth feedback to the rider and also ends up smaller in size.

As can be seen more clearly in FIG. 23, as the shuttle 258 experiences translational movement in response to movement of the cam 248 and cam plate 246, the rack gears 264, which are offset mounted inside the shuttle 258, engage the respective arm gear 266 and spur gear 270, causing them to rotate or counter-rotate, as the case may be, with respect to the shaft 252. The interconnection between the arm gear 266 and the first roller clutch 278 and the interconnection between the spur gear 270 and the second roller clutch 280 causes these clutches to engage and disengage respectively within the roller clutch mounting 282.

Thus, while representative embodiments of the invention have been illustrated and described, it can be seen that various changes may be made therein without departing from the spirit and scope of the invention. Moreover, a feedback mechanism may be provided, such as a microcontroller to aid in controlling the transmission. For example, the microcontroller can be preprogrammed with waveforms to provide a specific tailored output waveform or transfer function as desired by a user. The microcontroller would be mounted on the vehicle or machine and include user input to select the waveform or in another embodiment to adjust the waveform. Control can also be manual, as desired.

Consequently, the invention is to be limited only by the scope of the appended claims and the equivalents thereof.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A rotary force transfer device, comprising:
   a housing having a cam mounted thereon;
   a central axle rotatably mounted in the housing and configured to receive an input torque;
   a torque-split mechanism comprising reciprocating means driven by the central axle and the eccentricity of the cam to split torque from the central axle;
   a control mechanism coupled to the housing for controlling the torque-split mechanism; and
   a clutch mechanism selectively coupling the torque-split mechanism to an output, wherein the clutch mechanism couples the central axle to the output in a 1:1 ratio when there is zero relative velocity between moving parts in the torque split mechanism.

2. The device of claim 1, wherein the reciprocating means comprise one from among a pair of rocker arms and a shuttle assembly.

3. A rotary force transfer device comprising: a housing having a cam mounted thereon; a central axle rotatably mounted in the housing and configured to receive an input torque; a torque-split mechanism comprising reciprocating means driven by the central axle and the eccentricity of the cam to split torque from the central axle; a control mechanism coupled to the housing for controlling the torque-split mechanism; and a clutch mechanism selectively coupling the reciprocating means to an output, wherein the cam has an annular shape and is mounted over the central axle to pivot into and out of axial alignment with the central axle in response to the control mechanism, thereby changing a ratio of rotational input to rotational output.

4. A rotary force transfer device comprising: a housing having a cam mounted thereon; a central axle rotatably mounted in the housing and configured to receive an input torque; a torque-split mechanism comprising reciprocating means driven by the central axle and the eccentricity of the cam to split torque from the central axle; a control mechanism coupled to the housing for controlling the torque-split mechanism; and a clutch mechanism selectively coupling the reciprocating means to an output, wherein the reciprocating means comprise a shuttle assembly including a shuttle carrier mounted on the axle to rotate with the axle and a shuttle mechanism mounted over the axle to rotate independent of the axle and in cooperation with the shuttle carrier and the cam.

5. The device of claim 4 wherein the shuttle mechanism cooperates with the cam and shuttle carrier to move in a direction transverse to the longitudinal axis of the central axle when the central axle rotates and the cam is out of axial alignment with the central axle.

6. The device of claim 5 wherein the shuttle mechanism comprises a first shuttle member and a second shuttle member each cooperating with the cam and the shuttle carrier to move independent of each other in a direction transverse to the longitudinal axis of the central axle.

7. The device of claim 6 wherein the clutch member selectively couples the first and second shuttle members to the output when the first and second shuttle members are at a substantially zero velocity relative to the output to minimize a torque feedback to a user.

8. A mechanical cam and clutch continuously variable transmission, comprising:
   a housing;
   a torque input shaft rotatably mounted in the housing;
   a cam mounted to the housing and configured to move in a direction transverse to a longitudinal axis of the input shaft;
   a device for moving the cam relative to the longitudinal axis of the input shaft;
   a torque transfer mechanism comprising a shuttle carrier mounted on the input shaft to rotate with the input shaft, a shuttle assembly mounted over the shaft and cooperating with the shuttle carrier and the cam, the shuttle assembly including a shuttle follower mounted over the input shaft to rotate independent of the input shaft, and first and second torque transfer shafts rotatably mounted over the input shaft and coaxial with each other and with the input shaft, each of the first and second torque transfer shafts having a coupling device on a first end of the shaft for coupling the torque transfer shaft to the shuttle follower, and each shaft having a clutch input device at a second end thereof; and
   a clutch output device configured to alternately connect the clutch input devices on the second end of the first and second shafts to an output shaft.

9. The device of claim 8 wherein the clutch output device is configured to be coupled to the output shaft at a zero relative velocity between the first and second shafts and the output shaft.

10. The device of claim 8 wherein the shuttle follower comprises at least one follower device for following the cam during rotation of the shuttle follower to cause the shuttle follower to move back and forth in a path that is transverse to the longitudinal axis of the input shaft.

11. The device of claim 8 wherein each coupling device on the first and second shafts comprises a pinion gear configured to cooperate with a rack gear mounted on the shuttle follower and configured to rotate the respective shaft about the longitudinal axis of the input shaft in both a clockwise and counterclockwise direction in response to the shuttle follower cooperating with the cam.

12. The device of claim 11 wherein the shuttle follower comprises a first shuttle follower member and a second shuttle follower member each cooperating with the cam and the shuttle carrier to move independent of each other in a direction transverse to the longitudinal axis of the input shaft.

13. A vehicle, comprising:
   A rotary force transfer device, comprising:
      a housing;
      a central axle rotatably mounted in the housing and configured to receive an input torque;
      a torque-split mechanism comprising a cam coupled to the central axle and a reciprocating structure driven by eccentricity of the cam to the central axle to split torque from the central axle;
      a control mechanism coupled to the housing for controlling the torque-split mechanism; and
      a clutch mechanism selectively coupling the reciprocating structure to an output, wherein the cam has an annular shape and is mounted over the central axle to pivot into and out of axial alignment with the central axle in response to the control mechanism, thereby changing a ratio of rotational input to rotational output.

14. The vehicle of claim 13, wherein the reciprocating structure comprises one from among a pair of rocker arms and a shuttle assembly.

15. A vehicle, comprising:
   a rotary force transfer device, comprising:
      a housing;
      a central axle rotatably mounted in the housing and configured to receive an input torque;
      a torque-split mechanism comprising a cam coupled to the central axle and a torque-split mechanism driven by eccentricity of the cam to the central axle to split torque from the central axle;
      a control mechanism coupled to the housing for controlling the torque-split mechanism; and
      a clutch mechanism selectively coupling the reciprocating means to an output,
      wherein the torque-split mechanism comprises a shuttle assembly including a shuttle carrier mounted on the axle to rotate with the axle and a shuttle mechanism mounted over the axle to rotate independent of the axle and in cooperation with the shuttle carrier and the cam.

16. The vehicle of claim 15 wherein the shuttle mechanism cooperates with the cam and shuttle carrier to move in a direction transverse to the longitudinal axis of the central axle when the central axle rotates and the cam is out of axial alignment with the central axle.

17. The vehicle of claim 16 wherein the shuttle mechanism comprises a first shuttle member and a second shuttle member each cooperating with the cam and the shuttle carrier to move independent of each other in a direction transverse to the longitudinal axis of the central axle.

18. The vehicle of claim 17 wherein the clutch member selectively couples the first and second shuttle members to the output when the first and second shuttle members are at a substantially zero velocity relative to the output to minimize a torque feedback to a user.

* * * * *